US00RE43745E

(19) United States
(12) Reissued Patent
Walker et al.

(10) Patent Number: US RE43,745 E
(45) Date of Reissued Patent: Oct. 16, 2012

(54) TYMPANIC THERMOMETER PROBE COVER WITH FILM SUPPORT MECHANISM

(75) Inventors: Clarence Walker, St. Louis, MO (US); Kevin C. Meier, Affton, MO (US); Wayne Schuessler, St. Louis, MO (US); David Rork Swisher, St. Charles, MO (US)

(73) Assignee: Tyco Healthcare Group LP, Mansfield, MA (US)

(21) Appl. No.: 12/757,746

(22) Filed: Apr. 9, 2010

Related U.S. Patent Documents

Reissue of:
(64) Patent No.: 7,354,194
Issued: Apr. 8, 2008
Appl. No.: 11/286,620
Filed: Nov. 23, 2005

(51) Int. Cl.
*G01K 1/08* (2006.01)
(52) U.S. Cl. ..... 374/158; 374/209; 374/208; 600/184
(58) Field of Classification Search ..... 374/120–121, 374/158, 208, 209, 163, 183, 185; 600/549, 600/474; 702/131
See application file for complete search history.

(56) References Cited

U.S. PATENT DOCUMENTS

| | | | |
|---|---|---|---|
| 3,282,106 | A | 11/1966 | Barnes |
| 3,282,458 | A | 11/1966 | Rudd |
| 3,626,758 | A | 12/1971 | Stewart et al. |
| 3,681,991 | A | 8/1972 | Eberly, Jr. |
| 3,738,479 | A | 6/1973 | Sato |
| 3,765,238 | A | 10/1973 | Sumikama et al. |
| 3,822,593 | A | 7/1974 | Oudewaal |
| 3,832,669 | A | 8/1974 | Mueller et al. |
| 3,872,728 | A | 3/1975 | Joyce et al. |
| 3,878,836 | A | 4/1975 | Twentier |
| 3,884,219 | A | 5/1975 | Richardson et al. |
| 3,905,232 | A | 9/1975 | Knute |
| 3,915,371 | A | 10/1975 | Crabtree |

(Continued)

FOREIGN PATENT DOCUMENTS

EP 0 201 790 A2 11/1986

(Continued)

OTHER PUBLICATIONS

Anonymous, "FirstTemp Genius User Guide", Mar. 2004 (Mar. 2004), Tyco Healthcare, XP002444529, "the whole document".

(Continued)

*Primary Examiner* — Gail Verbitsky
(74) *Attorney, Agent, or Firm* — Lisa E. Winsor, Esq.

(57) ABSTRACT

A probe cover for a tympanic thermometer probe comprises a generally tubular body having an opening for receiving the thermometer probe and an infrared transparent window at a distal end thereof. In one embodiment, a film support extends radially inward from the distal end of the body and supports an infrared transparent film spanning the window. The film support has an inner edge that is substantially free from corners turning in the plane of the window. A plurality of end ribs are spaced apart and disposed about an inner circumference of the distal end of the body to engage a distal end of the thermometer probe and form an insulating gap by preventing contact of the film by the thermometer probe. The insulating gap also extends proximally into spaces between the end ribs, reducing thermal contact between the thermometer probe and a circumferential inner surface of the probe cover.

25 Claims, 24 Drawing Sheets

AMENDED

U.S. PATENT DOCUMENTS 3,942,891 A 3/1976 Spielberger et al.
3,949,740 A 4/1976 Twentier
4,007,832 A 2/1977 Paull et al.
4,008,614 A 2/1977 Turner et al.
4,054,057 A 10/1977 Kluge
4,117,926 A 10/1978 Turner et al.
4,143,765 A 3/1979 Moss, III
4,183,248 A 1/1980 West
4,349,109 A 9/1982 Scordato et al.
4,457,633 A 7/1984 Andrews
4,527,896 A 7/1985 Irani et al.
4,572,365 A 2/1986 Bruno et al.
4,576,486 A 3/1986 Dils
4,602,642 A 7/1986 O'Hara et al.
4,622,360 A 11/1986 Gomi et al.
4,636,091 A 1/1987 Pompei et al.
4,662,360 A 5/1987 O'Hara et al.
4,703,857 A 11/1987 Jahnen et al.
4,770,544 A 9/1988 Mossey
4,784,149 A 11/1988 Berman et al.
4,854,730 A 8/1989 Fraden
4,911,559 A 3/1990 Meyst et al.
4,993,424 A 2/1991 Suszynski et al.
5,017,018 A 5/1991 Iuchi et al.
5,018,872 A 5/1991 Suszynski et al.
D318,812 S 8/1991 Matsuura et al.
5,046,482 A 9/1991 Everest
5,060,819 A 10/1991 Apps
5,066,142 A 11/1991 DeFrank et al.
5,078,507 A 1/1992 Koller
5,088,834 A 2/1992 Howe et al.
5,100,018 A 3/1992 Rosati et al.
5,163,418 A 11/1992 Fraden et al.
5,179,936 A 1/1993 O'Hara et al.
5,188,459 A 2/1993 Mino et al.
5,292,001 A 3/1994 Langenbeck et al.
5,318,029 A 6/1994 Palese
5,364,186 A 11/1994 Wang et al.
5,411,032 A 5/1995 Esseff et al.
5,441,702 A 8/1995 Lemieux et al.
5,487,607 A 1/1996 Makita et al.
5,516,010 A 5/1996 O'Hara et al.
5,518,114 A 5/1996 Kohring et al.
5,518,560 A 5/1996 Li
5,609,564 A 3/1997 Makita et al.
5,638,951 A 6/1997 Fukura et al.
5,645,350 A 7/1997 Jang
5,795,067 A 8/1998 Fraden et al.
5,795,632 A 8/1998 Buchalter
5,820,264 A 10/1998 Tsao et al.
5,833,367 A 11/1998 Cheslock et al.
5,836,692 A 11/1998 Pompei
5,874,736 A 2/1999 Pompei
5,906,437 A 5/1999 Lin
5,948,362 A 9/1999 Steinbrenner et al.
5,980,451 A * 11/1999 O'Hara et al. ..... 600/121
5,994,701 A 11/1999 Tsuchimoto et al.
6,001,066 A 12/1999 Canfield et al.
6,022,140 A 2/2000 Fraden et al.
6,030,117 A 2/2000 Cheslock et al.
6,084,395 A 7/2000 Thiel
6,097,979 A 8/2000 Janotte
6,109,784 A 8/2000 Weiss
6,123,454 A 9/2000 Canfield et al.
6,139,182 A 10/2000 Levatter et al.
6,152,596 A 11/2000 Fraden
6,156,148 A 12/2000 Beerwerth et al.
6,179,785 B1 1/2001 Martinosky et al.
6,193,411 B1 2/2001 Chen
6,195,581 B1 2/2001 Beerwerth et al.
6,224,256 B1 5/2001 Bala
6,236,880 B1 5/2001 Raylman et al.
6,238,088 B1 5/2001 Wu
6,238,089 B1 5/2001 Vodzak et al.
6,254,271 B1 7/2001 Lin
6,319,206 B1 11/2001 Pompei et al.
6,332,090 B1 12/2001 DeFrank et al.
6,347,243 B1 2/2002 Fraden
6,367,973 B2 4/2002 Yamaka
6,386,757 B1 5/2002 Konno
6,390,671 B1 5/2002 Tseng
6,416,602 B1 7/2002 Firatli
6,447,160 B1 9/2002 Fraden
6,485,433 B1 11/2002 Peng
6,530,881 B1 3/2003 Ailinger et al.
6,549,794 B1 4/2003 Nadeau, Jr. et al.
6,605,034 B2 8/2003 Hascoet et al.
6,612,735 B2 9/2003 Tomioka et al.
6,634,787 B1 10/2003 Beerwerth et al.
6,647,284 B1 11/2003 Lee
6,694,174 B2 2/2004 Kraus et al.
6,695,474 B2 2/2004 Beerwerth et al.
6,733,464 B2 5/2004 Olbrich et al.
6,749,334 B2 6/2004 Lin
6,761,684 B1 7/2004 Speier
6,773,405 B2 8/2004 Fraden et al.
6,786,636 B1 9/2004 Huang et al.
6,789,936 B1 9/2004 Kraus et al.
6,814,697 B2 11/2004 Ouchi
6,827,486 B2 12/2004 Welker
6,840,402 B2 1/2005 Lin et al.
6,846,105 B2 1/2005 Xie et al.
6,851,850 B1 2/2005 Lee
6,855,108 B2 2/2005 Ishibiki et al.
6,869,393 B2 3/2005 Butler
6,908,439 B2 6/2005 Carney
6,911,005 B2 6/2005 Ouchi et al.
6,921,362 B2 7/2005 Ouchi
6,929,601 B2 8/2005 Nakao
6,939,039 B2 9/2005 Brunvoll
6,949,069 B2 9/2005 Farkas et al.
6,957,911 B2 10/2005 Wong et al.
6,971,790 B2 12/2005 Quinn et al.
6,979,122 B2 12/2005 Yu
6,981,796 B2 1/2006 Hsieh
6,991,368 B2 1/2006 Gerlitz
7,004,623 B2 2/2006 Nakagawa et al.
7,025,500 B2 4/2006 Tabata
7,036,984 B2 5/2006 Penney et al.
7,083,330 B1 8/2006 Yao
7,108,419 B2 9/2006 Harr
7,195,599 B2 3/2007 Carney et al.
7,237,949 B2 7/2007 Lantz et al.
7,354,194 B2 4/2008 Walker et al.
7,381,189 B2 6/2008 Friedman et al.
7,422,365 B2 9/2008 Chamberlain et al.
7,478,946 B2 1/2009 Harr et al.
7,520,668 B2 4/2009 Chen
7,520,671 B2 4/2009 Lantz et al.
7,556,424 B2 7/2009 Walker et al.
2001/0017880 A1 8/2001 Beerwerth et al.
2002/0176478 A1 11/2002 Tabata
2003/0067957 A1 4/2003 Ko et al.
2003/0176809 A1 9/2003 Lin
2004/0028116 A1* 2/2004 Lin ..... 374/121
2005/0002437 A1 1/2005 Fraden
2005/0083991 A1 4/2005 Wong
2005/0226307 A1 10/2005 Lussier et al.
2006/0214843 A1 9/2006 Klein et al.
2007/0189358 A1 8/2007 Lane et al.
2007/0253870 A1 11/2007 Weiss et al.
2009/0122836 A1 5/2009 Li

FOREIGN PATENT DOCUMENTS

EP 0201790 A1 11/1986
EP 0292417 B1 3/1993
EP 0589212 A1 3/1994
EP 0 589 212 B1 3/1997
EP 0 890 829 A1 1/1999
EP 0890829 A1 1/1999
EP 1 118 306 A1 7/2001
JP 4299225 A 10/1992
JP 06043037 2/1994
JP 06160127 6/1994
JP 6197869 A 7/1994
JP 10090070 A 4/1998
JP 11037853 A 2/1999

| | | | |
|---|---|---|---|
| JP | 11188008 | A | 7/1999 |
| JP | 2000225095 | A | 8/2000 |
| JP | 2001218742 | A | 8/2001 |
| JP | 2002051989 | A | 2/2002 |
| JP | 2002107230 | | 4/2002 |
| JP | 2002214046 | A | 7/2002 |
| JP | 2002355225 | A | 12/2002 |
| JP | 2003116795 | A | 4/2003 |
| WO | 98021556 | A1 | 5/1998 |
| WO | WO 98/21556 | A | 5/1998 |
| WO | 0052434 | A1 | 9/2000 |
| WO | WO 00/52434 | A | 9/2000 |
| WO | 2004063686 | A1 | 7/2004 |
| WO | WO 2004/063686 | A | 7/2004 |

OTHER PUBLICATIONS

Anonymous, "FirstTemp Genius Infrared Thermometry", Feb. 2004, Tyco Healthcare, XP002444549, pp. 1-4.
Tyco Healthcare brochure, "Temperature Monitoring", Jan. 2000, pp. TM-1-TM-8.
Hebbar, Kiran, et al., "Comparison of Temporal Artery Thermometer to Standard Temperature Measurements in Pediatric Intensive Care Unit Patients", Pediatric Critical Care Medicine, vol. 6, No. 5, Sep. 2005, 5 pages.
Mohammad-Irfan Suleman, et al, "Insufficiency in a New Temporal-Artery Thermometer for Adult and Pediatric Patients", Anesthesia Analgesia, vol. 95, No. 1, Jan. 2002, 5 pages.
Office action issued Sep. 17, 2010 in related U.S. Appl. No. 12/333,872, 8 pgs.
Office action issued Jun. 27, 2007 in related U.S. Appl. No. 11/567,434, 6 pgs.
Response filed Sep. 7, 2007 to Office Action dated Jun. 27, 2007 from related U.S. Appl. No. 11/567,434, 6 pgs.
Office action issued Nov. 28, 2007 in related U.S. Appl. No. 11/567,434, 7 pgs.
Response filed Apr. 24, 2008 to Office Action dated Nov. 28, 2007 from related U.S. Appl. No. 11/567,434, 5 pgs.
Office action issued Aug. 21, 2008 in related U.S. Appl. No. 11/567,434, 5 pgs.
Response filed Dec. 2, 2008 to Office Action dated Aug. 21, 2008 from related U.S. Appl. No. 11/567,434, 4 pgs.
Office action issued Dec. 13, 2007 in related U.S. Appl. No. 11/419,441, 9 pgs.
Response filed May 12, 2008 to Office Action dated Dec. 13, 2007 from related U.S. Appl. No. 11/419,441, 14 pgs.
Office action issued Sep. 12, 2008 in related U.S. Appl. No. 11/419,441, 11 pgs.
Response filed Jan. 9, 2009 to Office Action dated Sep. 12, 2008 from related U.S. Appl. No. 11/419,441, 11 pgs.
Office action issued Feb. 26, 2009 in related U.S. Appl. No. 11/419,441, 8 pgs.
Response filed Jun. 18, 2009 to Office Action dated Feb. 26, 2009 from related U.S. Appl. No. 11/419,441, 12 pgs.
Office action issued Feb. 23, 2007 in related U.S. Appl. No. 11/286,620, 13 pgs.
Response filed Aug. 21, 2007 to Office Action dated Feb. 23, 2007 from related U.S. Appl. No. 11/286,620, 12 pgs.
Office action issued Nov. 2, 2007 in related U.S. Appl. No. 11/286,620, 9 pgs.
Response filed Nov. 13, 2007 to Office Action dated Nov. 2, 2007 from related U.S. Appl. No. 11/286,620, 7 pgs.
Office action issued Sep. 21, 2006 in related U.S. Appl. No. 10/538,314, 5 pgs.
Response filed Nov. 8, 2006 to Office Action dated Sep. 21, 2006 from related U.S. Appl. No. 10/538,314, 9 pgs.
Office action issued Feb. 7, 2007 in related U.S. Appl. No. 10/538,314, 7 pgs.
Response filed Apr. 4, 2007 to Office Action dated Feb. 7, 2007 from related U.S. Appl. No. 10/538,314, 4 pgs.
Supplemental Response filed Apr. 4, 2007 to Office Action dated Feb. 7, 2007 from related U.S. Appl. No. 10/538,314, 7 pgs.
Office action issued Sep. 15, 2009 in related U.S. Appl. No. 12/333,872, 6 pgs.
Response filed Nov. 12, 2009 to Office Action dated Sep. 15, 2009 from related U.S. Appl. No. 12/333,872, 5 pgs.
Office action issued Mar. 17, 2010 in related U.S. Appl. No. 12/333,872, 6 pgs.
Response filed Jul. 14, 2010 to Office Action dated Mar. 17, 2010 from related U.S. Appl. No. 12/333,872, 10 pgs.
Office action issued Sep. 25, 2007 in related U.S. Appl. No. 11/419,438, 10 pgs.
Response filed Feb. 29, 2008 to Office Action dated Sep. 25, 2007 from related U.S. Appl. No. 11/419,438, 11 pgs.
Supplemental Response filed Mar. 24, 2008 to Office Action dated Sep. 25, 2007 from related U.S. Appl. No. 11/419,438, 10 pgs.
Office action issued May 23, 2008 in related U.S. Appl. No. 11/419,438, 7 pgs.
Response filed Aug. 5, 2008 to Office Action dated May 23, 2008 from related U.S. Appl. No. 11/419,438, 5 pgs.
European Search Report regarding related application serial No. EP 07009973.4 dated Aug. 9, 2007, 9 pgs.
European Exam Report regarding related application serial No. EP 07009973.4 dated Oct. 19, 2009, 5 pgs.
Response filed Nov. 18, 2010 to Office action dated Sep. 17, 2010 from related U.S. Appl. No. 12/333,872, 9 pgs.
Advisory Action issued Dec. 2, 2010 from related U.S. Appl. No. 12/333,872, 3 pgs.
Response filed Dec. 15, 2010 to Advisory Action dated Dec. 2, 2010 from related U.S. Appl. No. 12/333,872, 6 pgs.

* cited by examiner

AMENDED
FIG. 5
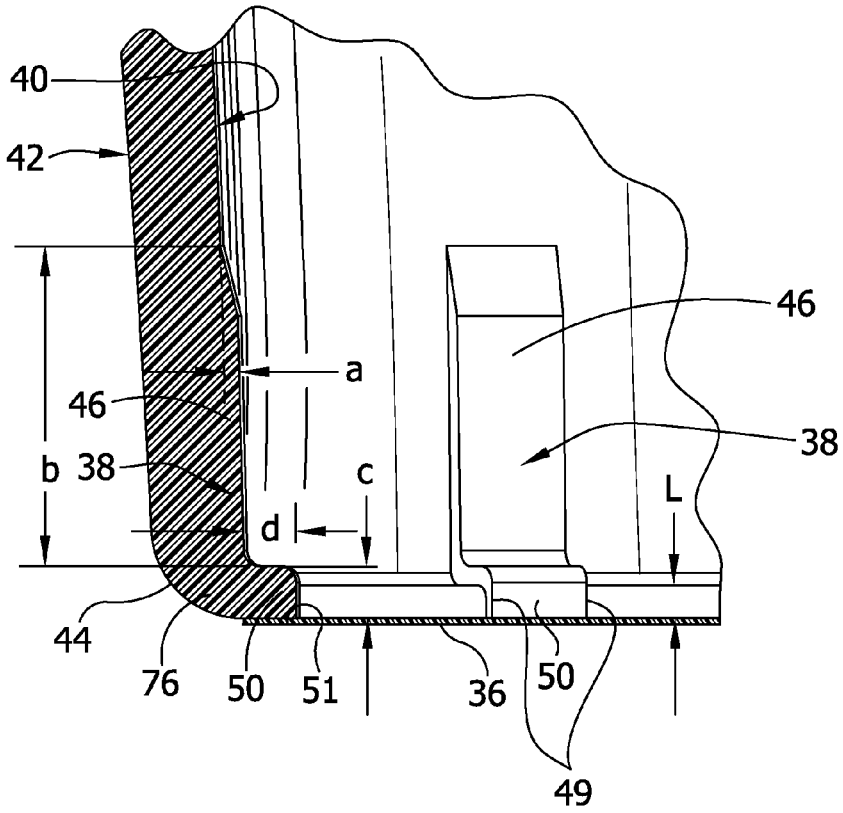

AMENDED
FIG. 6
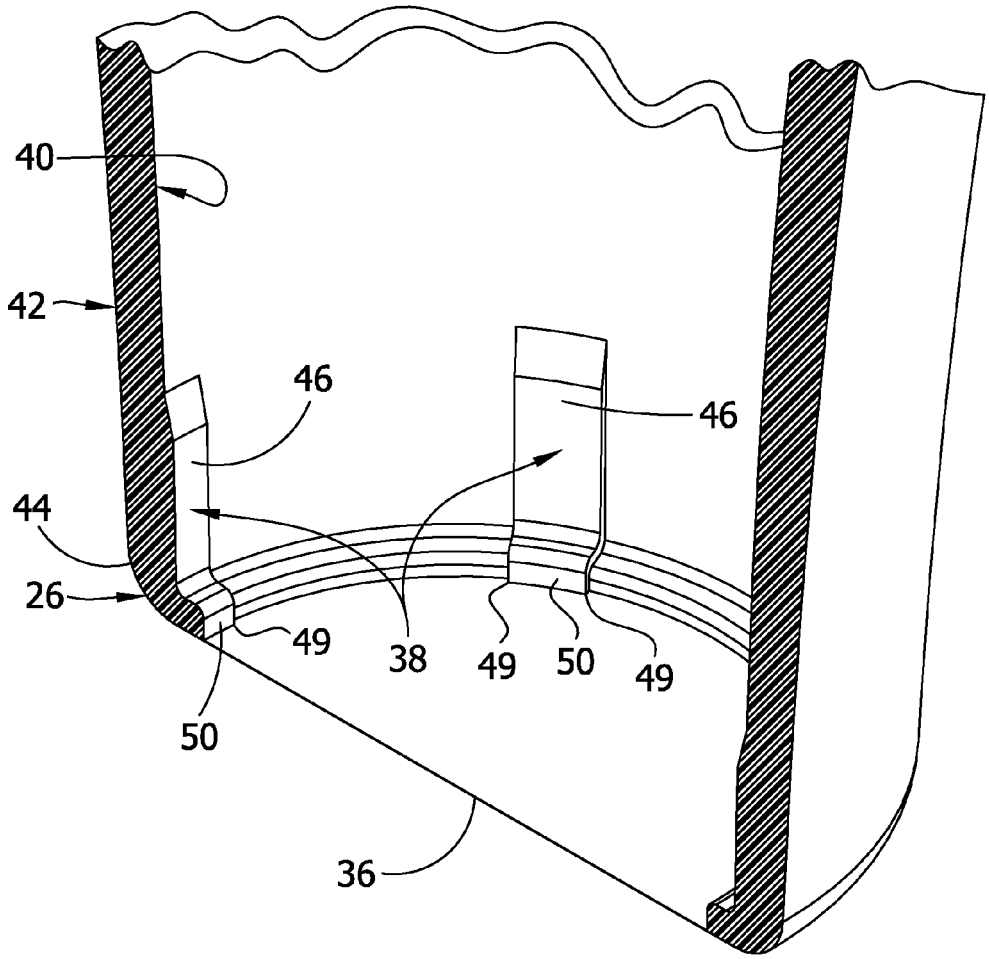

AMENDED
FIG. 14
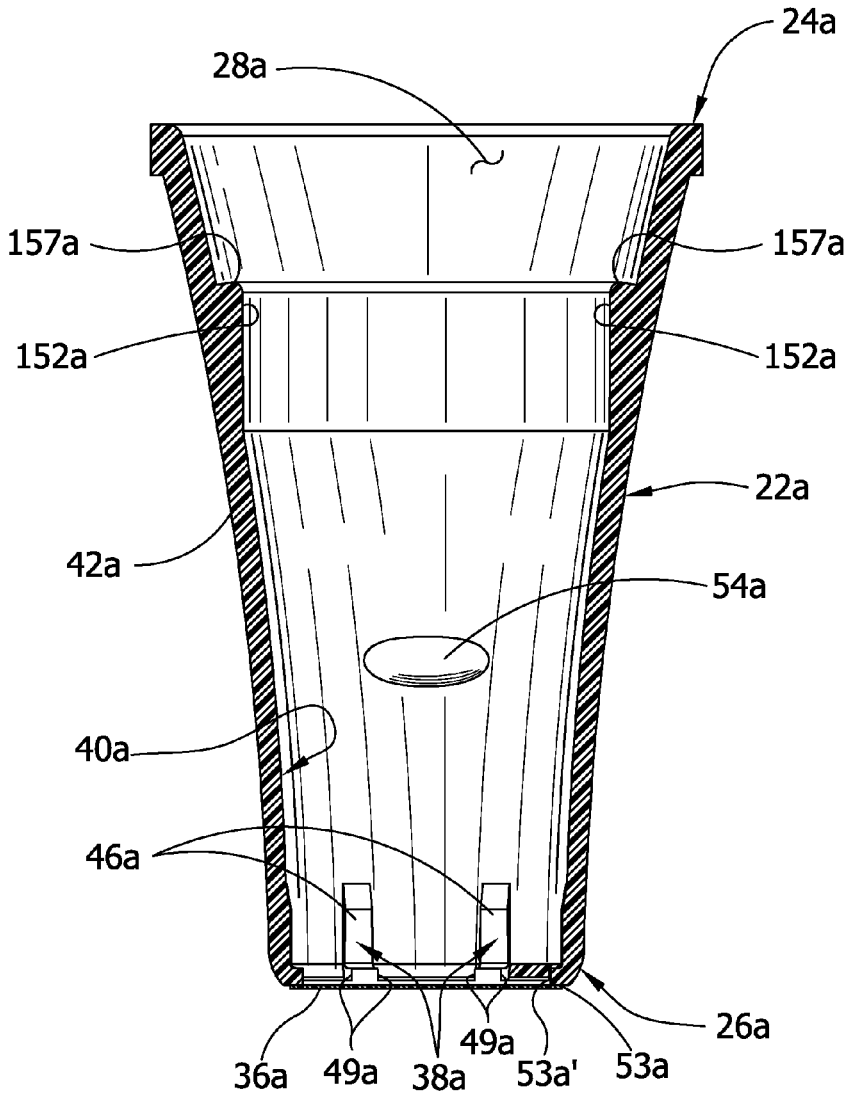

AMENDED
FIG. 15
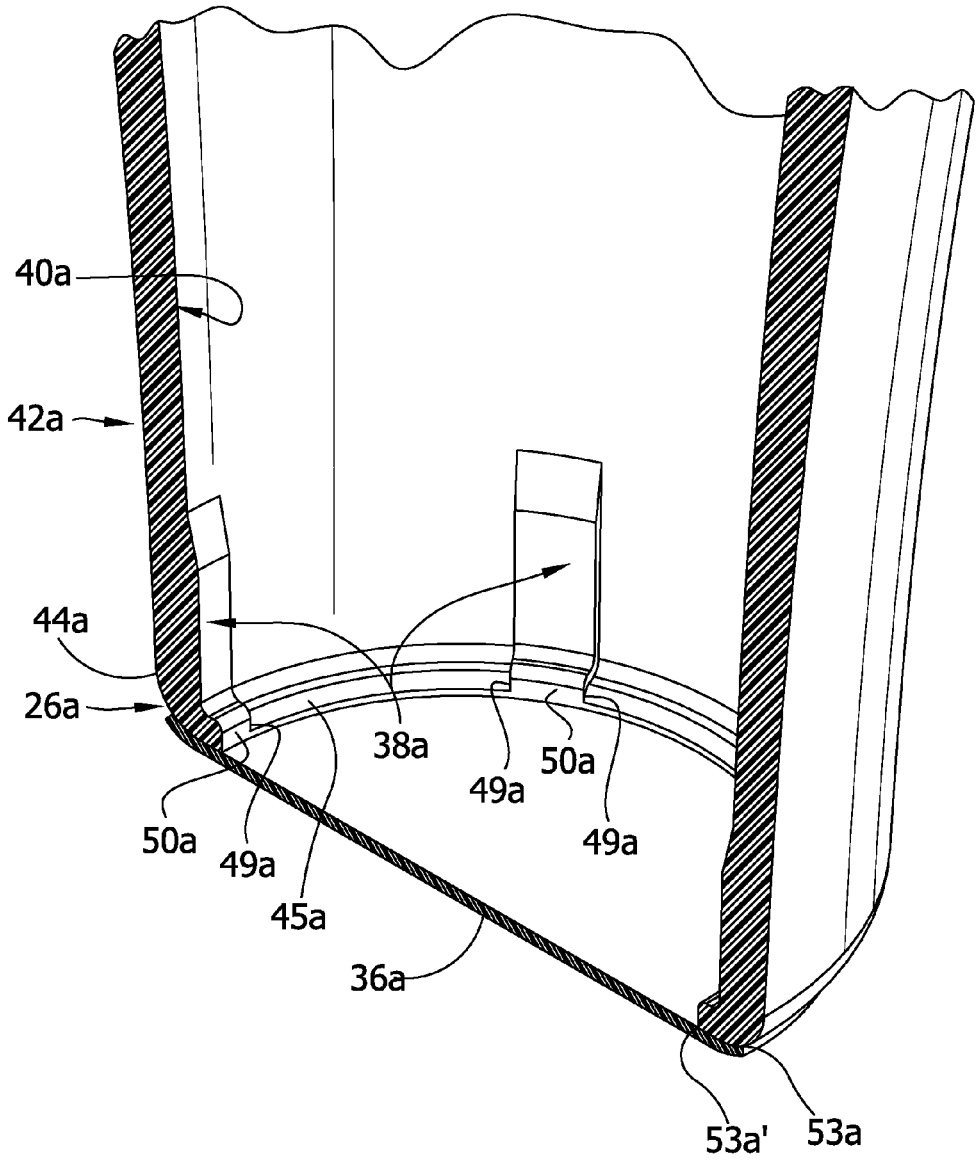

AMENDED
FIG. 22
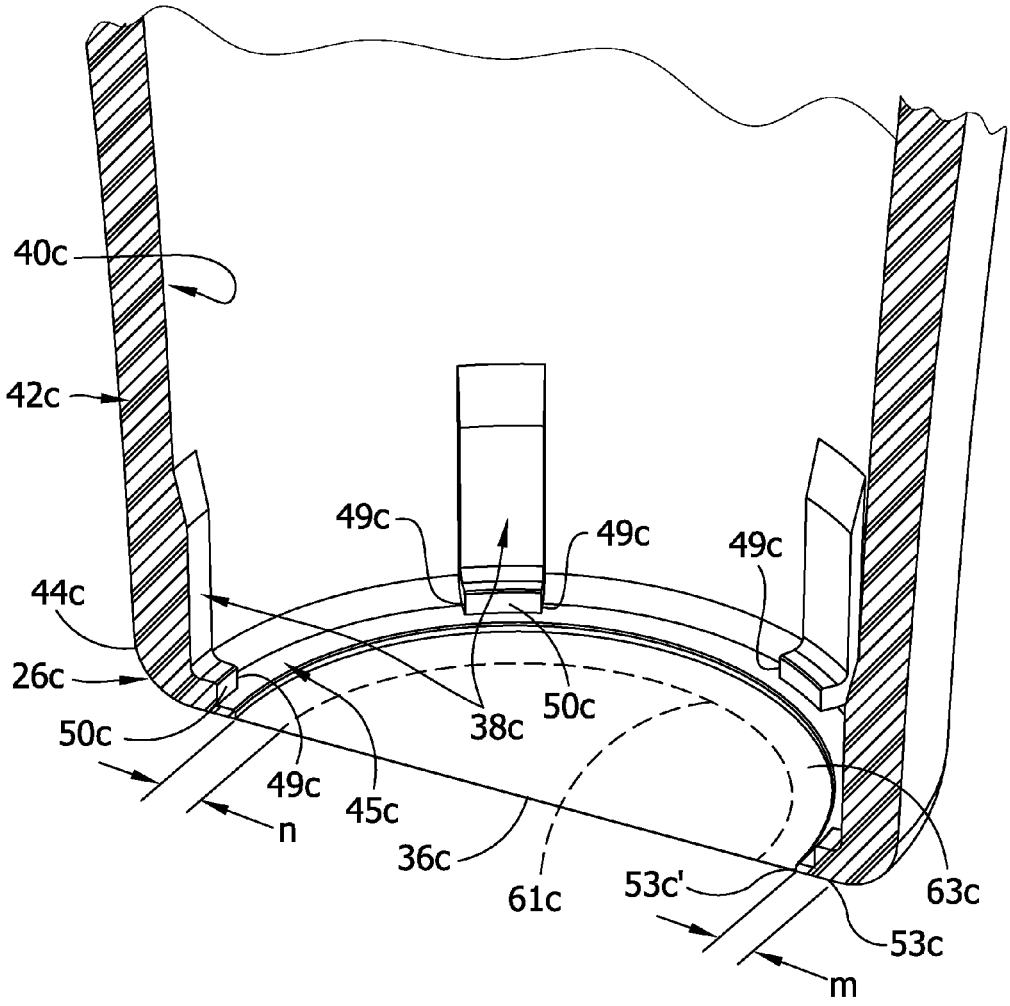

TYMPANIC THERMOMETER PROBE COVER WITH FILM SUPPORT MECHANISM

Matter enclosed in heavy brackets [ ] appears in the original patent but forms no part of this reissue specification; matter printed in italics indicates the additions made by reissue.

FIELD OF THE INVENTION

The present disclosure generally relates to the field of biomedical thermometers, and more particularly, to a probe cover for a tympanic thermometer.

BACKGROUND OF THE INVENTION

Medical thermometers are typically employed to facilitate the prevention, diagnosis and treatment of diseases, body ailments, etc. for humans and other animals, as is known. Doctors, nurses, parents, care providers, etc. use thermometers to measure a subject's body temperature for detecting a fever, monitoring the subject's body temperature, etc. An accurate reading of a subject's body temperature is needed for effective use and should be taken from the internal or core temperature of a subject's body. Several thermometer devices are known for measuring a subject's body temperature, such as, for example, glass, electronic, ear (tympanic).

Glass thermometers, however, are very slow in making measurements, typically taking several minutes to determine body temperature. This can result in discomfort to the subject, and may be very troublesome when taking the temperature of a small child or an invalid. Further, glass thermometers are susceptible to error and are typically accurate only to within a degree.

Electronic thermometers have shorter measurement times and improve accuracy over glass thermometers. Electronic thermometers, however, still typically take about thirty (30) seconds to get an accurate reading. They can also cause discomfort as the thermometer device must be inserted into the subject's mouth, rectum or axilla.

Tympanic thermometers are generally considered by the medical community to be superior for taking a subject's temperature. Tympanic thermometers provide rapid and accurate readings of core temperature, overcoming the disadvantages associated with other types of thermometers. Tympanic thermometers measure temperature by sensing infrared emissions from the tympanic membrane (eardrum) in the external ear canal. The temperature of the tympanic membrane accurately represents the body's core temperature. Further, it only takes a few seconds to measure a subject's temperature in this manner.

In operation, a tympanic thermometer is prepared for use and a probe cover is mounted onto a sensing probe extending from a distal portion of the thermometer. The probe cover provides a sanitary barrier between the subject and the thermometer. A practitioner or other care provider inserts a portion of the probe having the probe cover mounted thereon into a subject's outer ear canal to sense the infrared emissions from the tympanic membrane. The infrared light emitted from the tympanic membrane passes through a window of the probe cover and is directed to the sensing probe by a waveguide. The essential feature of the window is that it is substantially transparent to infrared radiation, thereby allowing infrared radiation from the tympanic membrane to pass through the probe cover to the heat sensing probe of the thermometer. Although an open window would be suitable for taking a temperature measurement, a film (e.g., a plastic film) having a thickness on the order of the wavelength of radiation in the far infrared range typically spans the window to provide a sanitary barrier.

The practitioner presses a button or similar device to cause the thermometer to take a temperature measurement. The microelectronics process electrical signals from the heat sensor to determine eardrum temperature and render a temperature measurement in a few seconds or less. The probe is removed from the ear canal and the probe cover discarded. A new probe cover is used each time the thermometer is used with a new subject.

Known tympanic thermometers typically include a probe containing a heat sensor such as a thermopile, a pyroelectric heat sensor, etc. See, for example, U.S. Pat. Nos. 6,179,785, 6,186,959, and 5,820,264. These types of heat sensors are particularly sensitive to the eardrum's radiant heat energy. The accuracy with which the sensing probe senses the infrared radiation emitted by the eardrum directly corresponds with the overall accuracy, repeatability and usability of the tympanic thermometer. The sensing probe must be sensitive to the low level of infrared energy emitted by an eardrum while providing a high degree of accuracy, repeatability and thermal noise immunity.

Current tympanic thermometers employ probe covers that may adversely affect accuracy of a temperature reading. The probe cover window of the probe cover typically contacts the probe. Consequently, the distal end of the probe can become disadvantageously heated by conductive heat transfer from the window, which is heated by its proximity to the subject. This may cause the sensing probe to detect radiation emitted from the heated distal end of the probe or other undesirable sources causing thermal noise that can lead to inaccurate temperature measurement. Further, current probe cover designs suffer from other drawbacks, such as poor retention characteristics with the probe and subject discomfort when inserted in the ear canal. In addition, the window through which the infrared radiation passes may be distorted during the measurement process. Such distortions may be caused by manufacturing inconsistencies and/or by deformation of the probe cover upon insertion of the probe into the cover or by insertion of the probe into the ear canal.

Therefore, it would be desirable to overcome the disadvantages and drawbacks of the prior art with a probe cover for a tympanic thermometer that improves accuracy and reliability of temperature measurements, for example by reducing conductive heat transfer to the probe and/or reducing error from distortions in the film barrier covering the window. It would also be desirable for such a probe cover to be comfortable for the subject. Further, it would be highly desirable if the probe cover was designed to facilitate stacking (e.g., nesting) of multiple probe covers for convenience in storage.

SUMMARY OF THE INVENTION

One embodiment of a probe cover of the present invention for a probe of a tympanic thermometer has a generally tubular body. The body has an opening at a proximal end for receiving a thermometer probe and a window at a distal end of the body. A film support extends radially inward from the distal end of the body toward a longitudinal axis of the body. The film support has an inner edge extending circumferentially around the longitudinal axis and defining a perimeter of the window. A film is at least partially supported by the film support and spans the window. A plurality of end ribs are spaced apart and disposed about an inner circumference of the distal end of the body. Each of the end ribs is positioned to engage a distal end of the thermometer probe and prevent contact of the film by the thermometer probe. At least some of the end ribs converge with the film support. The probe cover is substantially transparent to infrared radiation through the window. The perimeter of the window is substantially free from corners in a plane of the window.

Another embodiment of a probe cover has a generally tubular body. The body has an opening at a proximal end of the body for receiving a thermometer probe and a window at a distal end of the body. The body defines a circumferential inner surface extending generally from the proximal end to the distal end of the body. A film support extends radially inward from the distal end of the body toward a longitudinal axis thereof. The film support has an inner edge extending circumferentially around the longitudinal axis and defining a perimeter of the window. A film is at least partially supported by the film support and spans the window. The probe cover is configured to maintain a gap between the film and a distal end of the thermometer probe received in the opening. The gap has extensions into areas between the circumferential inner surface of the body and a side of the thermometer probe. The probe cover is substantially transparent to infrared radiation through the window. The perimeter of the window is substantially free from corners in a plane of the window.

Still another embodiment of a probe cover has a generally tubular body. The body has an opening at a proximal end of the body for receiving the thermometer probe and a window at a distal end of the body generally opposite the proximal end. A film support extends radially inward from the distal end of the body toward a longitudinal axis thereof. The film support has an inner edge extending circumferentially around the longitudinal axis and defining a perimeter of the window. The film support defines a substantially flat distally facing surface at the distal end of the body. A film is attached to at least a portion of the flat distally facing surface of the film support and spans the window. The film is substantially transparent to electromagnetic radiation for passing electromagnetic radiation through the window.

Yet another embodiment of a probe cover of the present invention has a generally tubular body. The body has a window at a distal end of the body and an opening at a proximal end of the body for receiving the thermometer probe having an electromagnetic radiation sensor with a general conical field of vision passing through the window when the probe is received in the tubular body. A film support extends radially inward from the distal end of the body toward a longitudinal axis thereof. The film support has an inner edge extending circumferentially around the longitudinal axis and defining a perimeter of the window. A film is supported at least in part by the film support and spans the window. The film is substantially transparent to electromagnetic radiation for passing electromagnetic radiation through the window. The film support is sized and shaped so that when the probe is received in the tubular body, the inner edge of the film support defining the window perimeter lies closely proximate to the field of vision of the electromagnetic radiation sensor.

Other objects and features will be in part apparent and in part pointed out hereinafter.

BRIEF DESCRIPTION OF THE DRAWINGS

FIG. 5 is an enlarged view of a portion of the cross-sectioned probe cover shown in FIG. 4;

FIG. 6 is an enlarged perspective view of a portion of the cross sectioned probe cover shown in FIG. 4 including the distal end thereof;

FIG. 14 is a cross-section of the probe cover shown in FIGS. 12 and 13 in a plane through a pair of opposing end ribs;

FIG. 15 is an enlarged perspective view of the cross-sectioned probe cover shown in FIGS. 12-14 showing a distal end thereof;

FIG. 22 in an enlarged perspective view of a portion of the cross-sectioned probe cover shown in FIG. 21 showing a distal end thereof.

Corresponding reference characters indicate corresponding parts throughout the drawings.

DETAILED DESCRIPTION

The exemplary embodiments of the probe cover and methods of use disclosed are discussed in terms of medical thermometers for measuring body temperature, and more particularly, in terms of a probe cover used with a tympanic thermometer that reduces unwanted heat transfer from the probe cover to a probe of the tympanic thermometer. Some embodiments of the invention may limit heat transfer from the probe cover to the probe of a tympanic thermometer; alleviate problems associated with distortion of a film membrane used to provide a sanitary barrier; enhance comfort to a subject during body temperature measurement; guard against spread of bacteria and disease; and/or facilitate health care practices aimed at prevention, diagnosis and/or treatment of diseases, body ailments, and the like. Some embodiments of the invention facilitate reliable and repeatable manufacturing of probe covers, particularly as related to the joining of an infrared transparent film to the end of the probe cover.

In the discussion that follows, the term "proximal" will refer to the portion of a structure that is closer to a practitioner in normal use, while the term "distal" will refer to the portion that is further from the practitioner in normal use. As used herein, the term "subject" refers to a human patient or other animal having its body temperature measured. The term "practitioner" refers to a doctor, nurse, parent or other care provider using a tympanic thermometer to measure a subject's body temperature, and may include support personnel.

The component portions of the probe cover, which is disposable, are fabricated from materials suitable for measuring body temperature via the tympanic membrane with a tympanic thermometer measuring apparatus. These materials may include, for example, plastic materials, such as, for example, polypropylene, polyethylene, etc. The materials used can vary depending on the particular temperature measurement application and/or preference of a practitioner. For example, a body of the probe cover can be fabricated from high density polyethylene (HDPE).

The probe cover has a window portion or film that can be fabricated from a material substantially transparent to infrared radiation and impervious to moisture, ear wax, bacteria, etc. The film, for example, may be fabricated from low density polyethylene (LDPE) and may have a thickness in the range of 0.0005 to 0.001 inches, although other ranges are contemplated. The film may be semi-rigid or flexible, and can be monolithically formed with the remaining portion of the probe cover or integrally connected thereto via, for example, thermal welding, stamping, etc. One skilled in the art, however, will realize that other materials and fabrication methods suitable for assembly and manufacture of probe covers would be appropriate and do not deviate from the scope of the invention.

Figure 3:
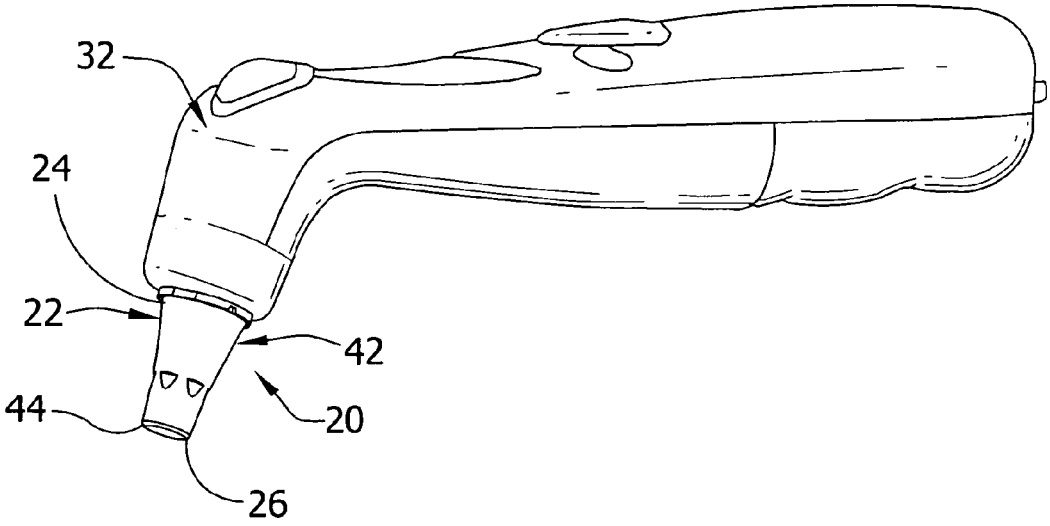
FIG. 3 is a perspective view of the probe cover mounted on a tympanic thermometer.
Figure 10:
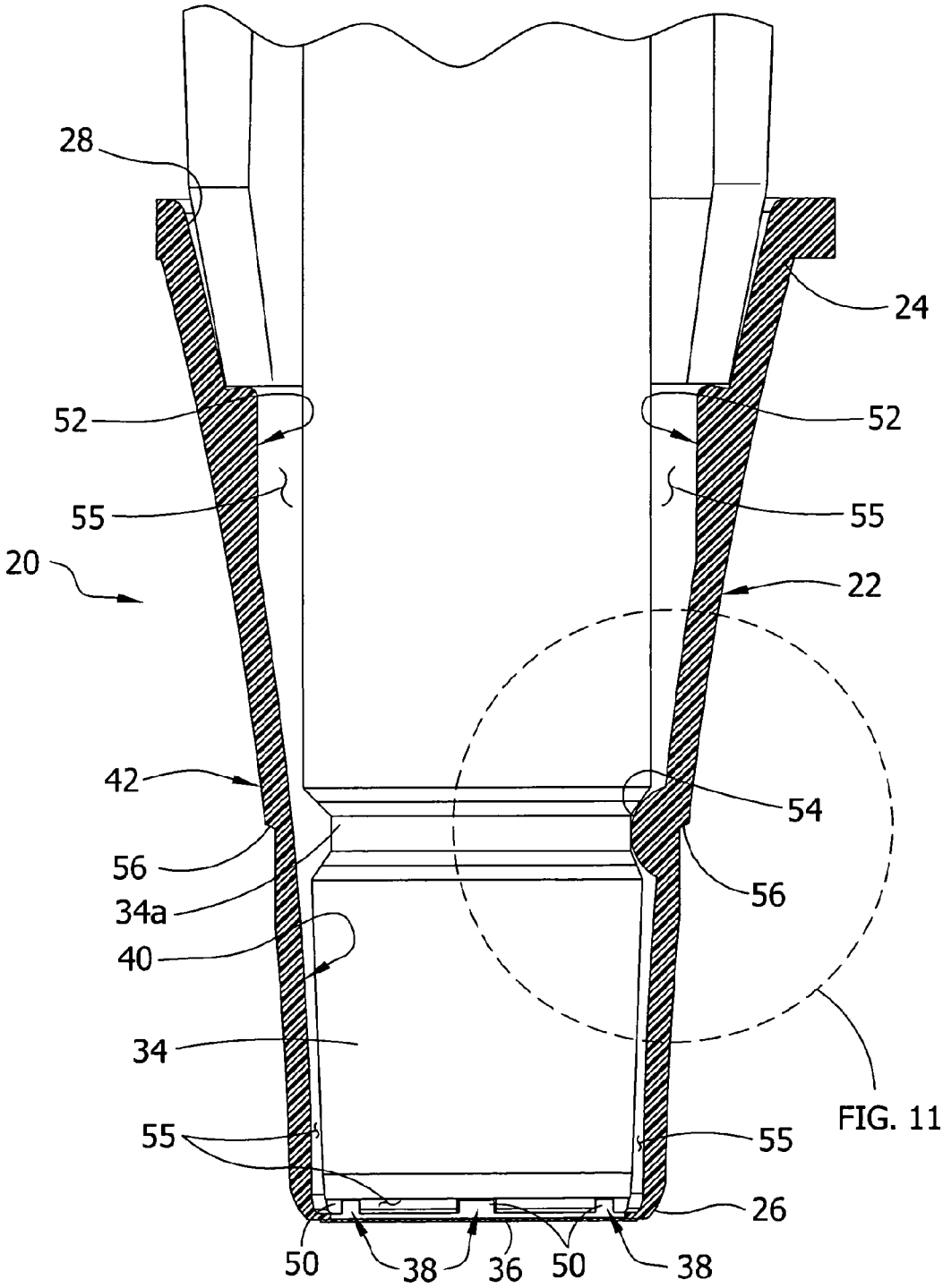
FIG. 10 is a cross-section of the probe cover as mounted onto a tympanic thermometer.

Some embodiments of the invention, which are illustrated in the accompanying figures, will now be described in greater detail. Referring first to FIGS. 1-11, there is illustrated one embodiment of a probe cover of the present invention, generally designated 20. The probe cover 20 defines a longitudinal axis X and has a generally tubular body 22, which extends in a tapered configuration from a proximal end 24 to a distal end 26. This design enhances comfort to a subject (not shown) during a temperature measurement procedure. The probe cover may be generally cylindrical, frustoconical or otherwise tapered or curved for insertion within the ear of the subject without departing from the scope of the invention. The proximal end 24 defines an opening 28 configured for receipt of a heat sensing probe 34 at a distal end of a tympanic thermometer 32, as shown in FIGS. 3 and 10. The heat sensing probe 34 is configured to detect infrared energy emitted by the tympanic membrane of the subject. The tympanic thermometer 32 may include a waveguide to facilitate sensing of the tympanic membrane heat energy.

A film 36 spans a window at the distal end 26 of the body 22. The film 36 is substantially transparent to infrared radiation and configured to facilitate sensing of infrared emissions by the heat sensing probe 34. For instance, the film 36 can be substantially perpendicular to the longitudinal axis X of the body 22 to allow for passage of infrared radiation through the probe cover 20 generally in the direction of the longitudinal axis to the heat sensing probe 34. The film 36 is preferably impervious to ear wax, moisture and bacteria, which may help prevent spread of disease.

As shown in FIGS. 4-7, the distal end 26 includes one or more end ribs 38 (e.g., a plurality of end ribs as shown in the drawings) disposed about an inner circumferential surface 40 of tubular body 22. The end ribs 38 have a longitudinal portion 46 extending proximally along the inner circumferential surface 40 of the tubular body 22. The longitudinal portion 46 projects a thickness a (FIG. 5) and extends a length b along inner surface 40. The end ribs 38 also have a transverse portion 50 projecting along a transverse surface 51 (i.e., generally perpendicular to longitudinal axis X) of film 36. The dimensions a, b, c and d are selected to facilitate support and engagement of the end ribs 38 with heat sensing probe 34 and to limit conductive heat transfer from the probe cover to the probe as described herein.

For example, in one embodiment of the invention, the dimension a is between about 0.002 inches and about 0.005 inches (e.g., about 0.003 inches); the dimension b is between about 0.035 inches and about 0.100 inches (e.g., about 0.083 inches); the dimension c is between about 0.010 and about 0.030 inches (e.g., about 0.017 inches); and the dimension d is between about 0.007 inches and about 0.020 inches (e.g., about 0.013 inches). Those skilled in the art will understand that the foregoing dimensions are exemplary and that the dimensions can vary substantially, particularly in view of the fact that probe covers are often designed for use with a particular tympanic thermometer and there is substantial variation in the size and shape of tympanic thermometers. The dimensions of a probe cover designed for use with the same tympanic thermometer can also vary significantly without departing from the scope of the invention. Those skilled in the art will also find guidance for the dimensioning probe covers in the description herein.

The transverse portions 50 of the end ribs 38 engage heat sensing probe 34 as the probe cover is placed thereon to prevent contact of the film 36 by the heat sensing probe 34. In this regard, the transverse portions 50 of the end ribs 38 are spacers that keep the heat sensing probe 34 spaced apart from film 36. Dimension c (FIG. 5) of the transverse portions 50 provides the depth necessary to maintain an air/fluid gap or cavity 55 (FIGS. 10 and 10A) between the heat sensing probe 34 and the film 36. In one embodiment, the dimension c is selected so the air gap 55 is between about 0.005 inches and about 0.025 inches thick (e.g., about 0.017 inches thick) at the distal end of the thermometer probe 34. Similarly, the longitudinal portions 46 of the end ribs 38 engage the heat sensing probe 34 to prevent contact of the inner circumferential surface 40 of the body 22 by the heat sensing probe. Thus, the insulating air gap 55 between the distal end of the heat sensing probe 34 and the probe cover extends proximally along the side of the heat sensing probe between probe and the end ribs 38. Limiting contact between the distal end of the heat sensing probe 34 and the probe cover 20 in this manner reduces opportunity for unwanted heat transfer between the probe cover and the heat sensing probe, allowing more accurate temperature measurements to be taken.

The probe cover 20 is sized to result in an interference fit with the heat sensing probe 34. In particular, when the longitudinal portions 46 of the end ribs 38 engage the heat sensing probe 34 as the probe cover is being placed thereon, the heat sensing probe slightly deforms the end ribs 38, forcing them to spread apart from one another slightly at the distal end of the body 22. The spreading of the end ribs 38 at the distal end of the body is transmitted to the film 36, thereby stretching the film and causing it to become radially taught. This stretching reduces distortion (e.g., wrinkling) of the film 36 and allows for improved accuracy of temperature measurement.

The tubular body 22 has an outer circumferential surface 42, which includes an arcuate surface 44 adjacent the distal end 26. The arcuate surface 44 curves inward toward the longitudinal axis X, thereby enhancing comfort and facilitating insertion of probe cover 20 into a subject's ear canal. The degree of inward curvature of the arcuate surface 44 may be varied to suit the needs of a particular application or to suit a particular preference. Moreover, a chamfered or tapered shape could be used rather than an arcuate surface without departing from the scope of the invention.

Figure 4:
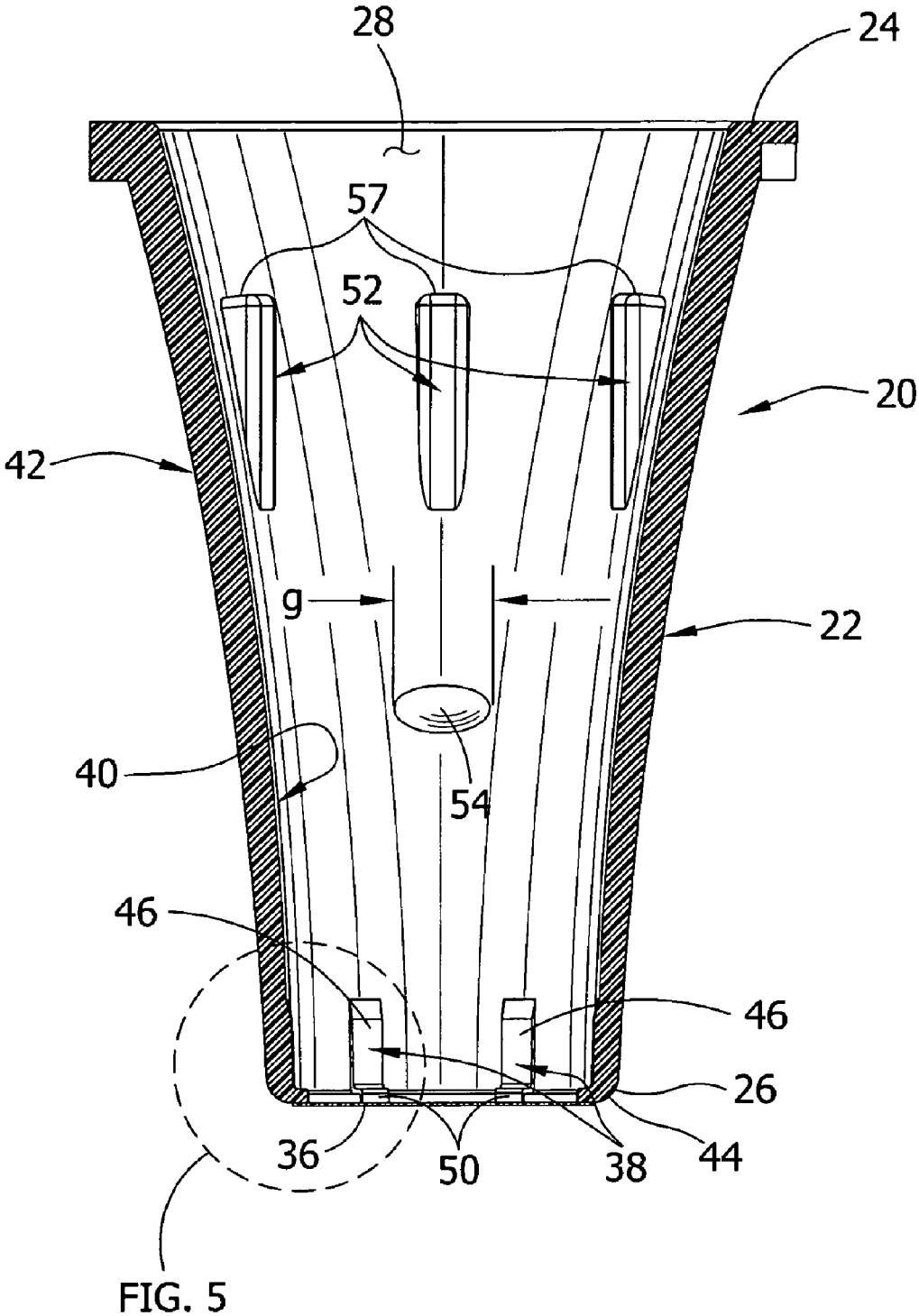
FIG. 4 is a cross-section of the probe cover in a plane through each of a pair of opposing end ribs of the probe cover.
Figure 7:
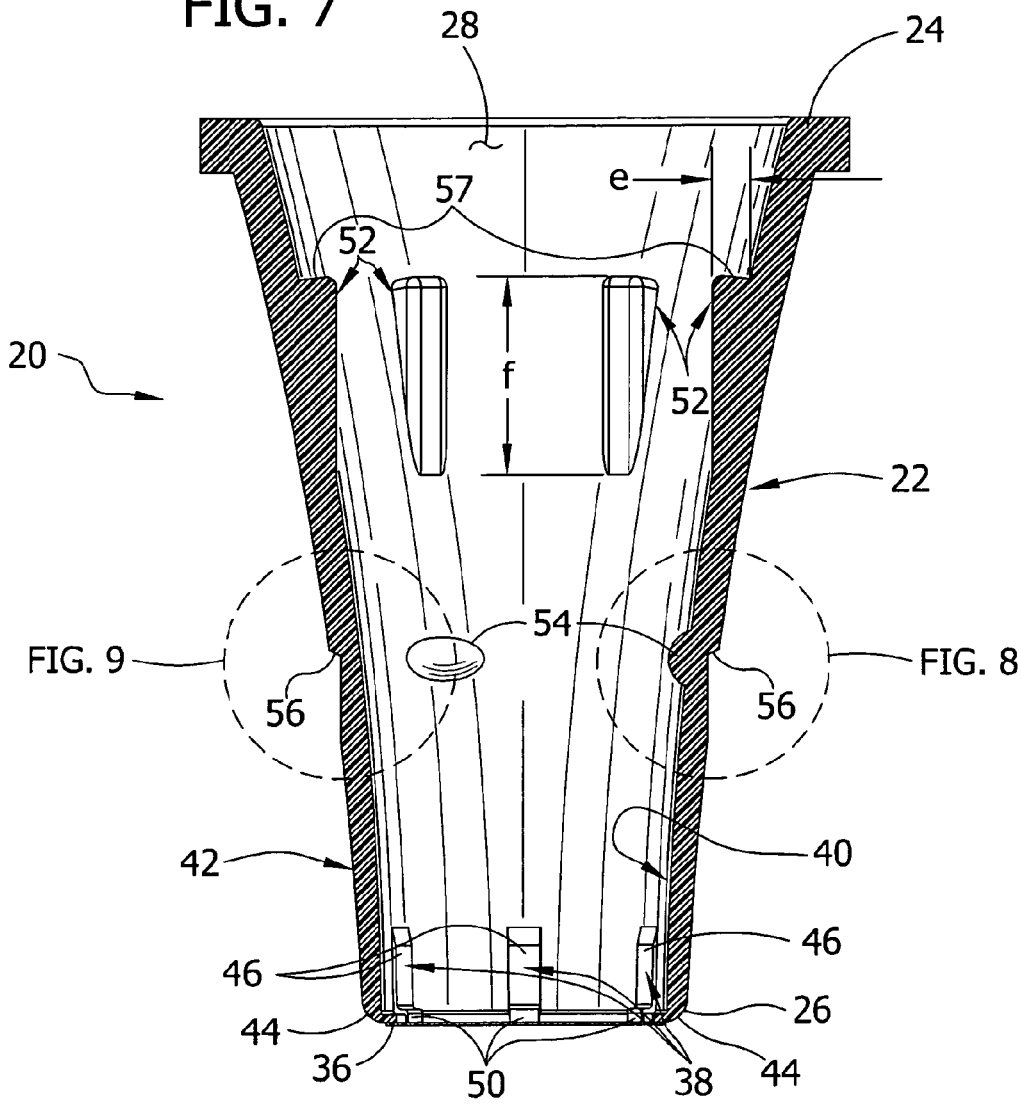
FIG. 7 is cross-section of the probe cover in a plane extending through a protuberance on the inside of the probe cover and a pair of indentations on opposite sides of the outside of the probe cover.

As shown in FIGS. 4 and 7, the body 22 defines one or more longitudinal ribs 52 (e.g., a plurality of longitudinal ribs as shown in the drawings) projecting from the inner circumferential surface 40 and being proximally spaced from the distal end 26 of the body and the end ribs 38. The longitudinal ribs 52 project a thickness e (FIG. 7) from the inner circumferential surface 40 and extend a length f along the inner circumferential surface 40. For example, the dimension e may be between about 0.015 inches and about 0.040 inches and the dimension f may be between about 0.10 inches and about 0.30 inches. The longitudinal ribs 52 each define a transverse face 57 that is configured to engage a shoulder on the heat sensing probe 34 when the probe cover 20 is placed thereon. The dimensions e and f are selected to configure the longitudinal ribs 52 and the transverse faces 57 thereof to facilitate releasable retention of probe cover 20 on the heat sensing probe 34. The transverse faces 57 of the longitudinal ribs 52 can be used as thrust surfaces for a probe cover eject mechanism.

Figure 8:
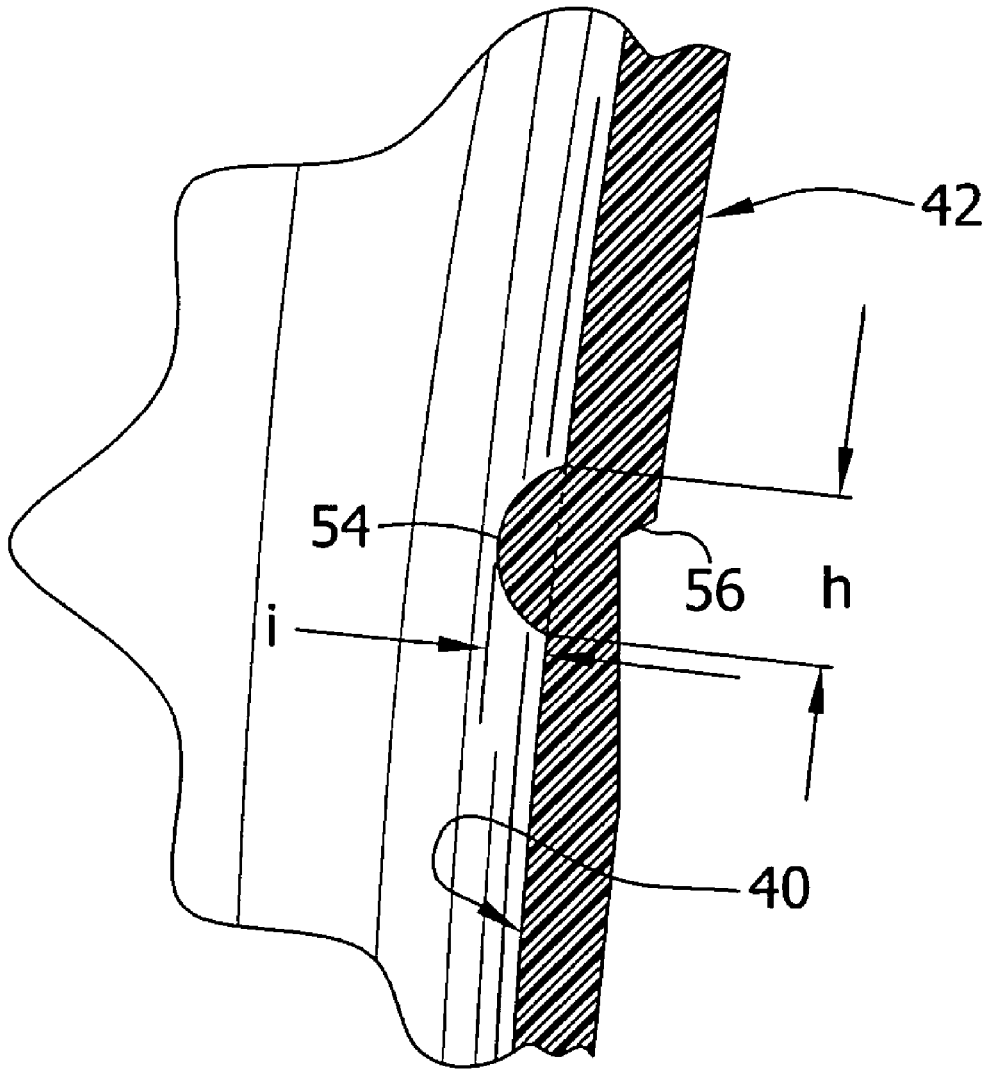
FIG. 8 is an enlarged view of a portion of the cross-sectioned probe cover showing the bisected protuberance in the area of detail indicated in FIG. 7.
Figure 9:
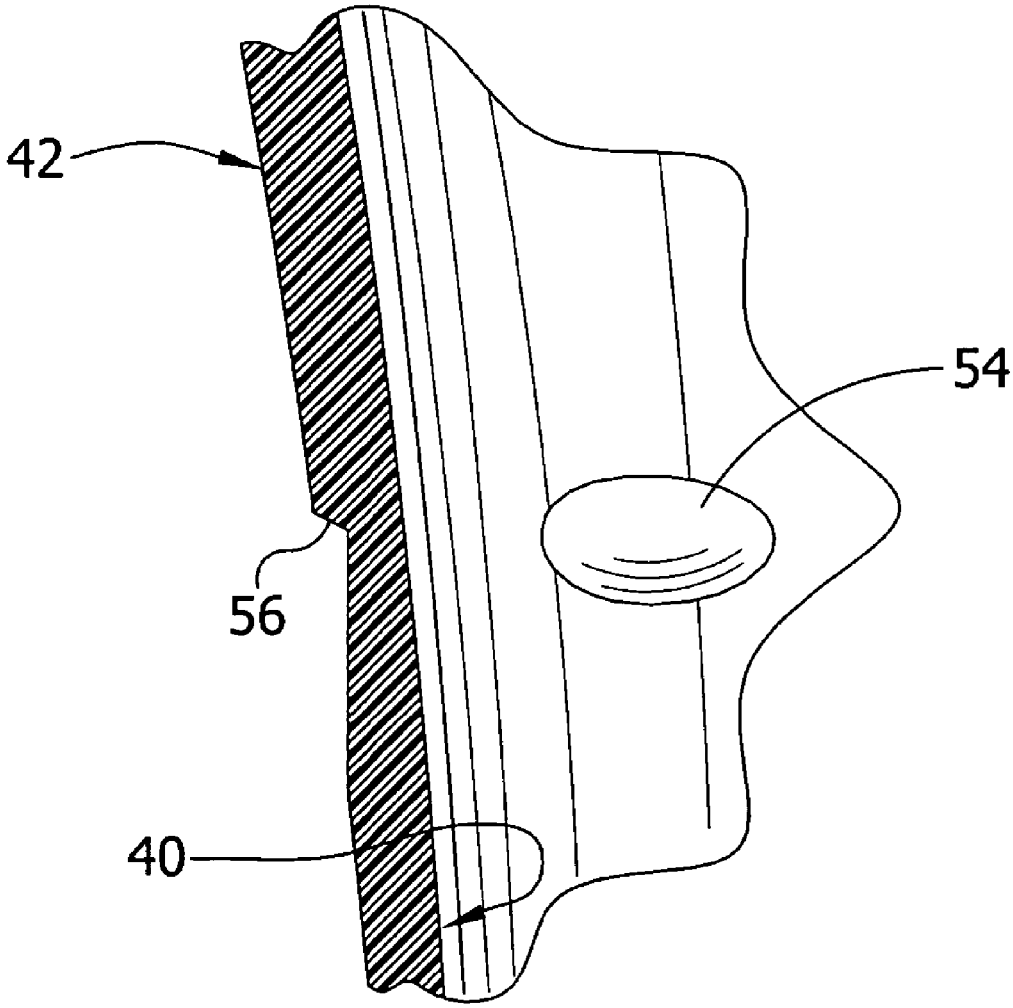
FIG. 9 is an enlarged view of a portion of the cross-section probe cover including one of the indentations in the area of detail indicated in FIG. 7.

As shown in FIG. 7, the body 22 defines one or more inner protuberances 54 (e.g., a plurality of inner protuberances as shown in the drawings) projecting from the inner circumferential surface 40 of the body 22 and being proximally spaced from the distal end 26 thereof. The inner protuberances 54 shown in the drawings are spaced at intervals and have an elliptical configuration having a width g (FIG. 4) and a height h (FIG. 8). The width g is larger than the height h. The inner protuberances 54 have a radial curvature projecting a thickness i (FIG. 8) from the inner circumferential surface 40 for being received in an annular groove 34a (FIG. 10) formed in the probe 34. When the probe cover 20 is mounted on the thermometer probe 34, the protuberances 54 lie in the groove 34a and hold the probe cover 20 against movement in the direction of the longitudinal axis X relative to the probe. Like the end ribs 38 and longitudinal ribs 52, the inner protuberances 54 help maintain the air gap 55 of separation between heat sensing probe 34 and the tubular body 22, thereby reducing undesired heating of heat sensing probe 34 from contact with the probe cover 20. The dimensions g, h, and i can be adjusted as needed to suit the size and shape of the annular groove for any particular thermometer. The body 22 also defines one or more indentations 56 (FIG. 9) in the outer circumferential surface 42 thereof, which are proximally spaced from the distal end 26 of the body.

Figure 1:
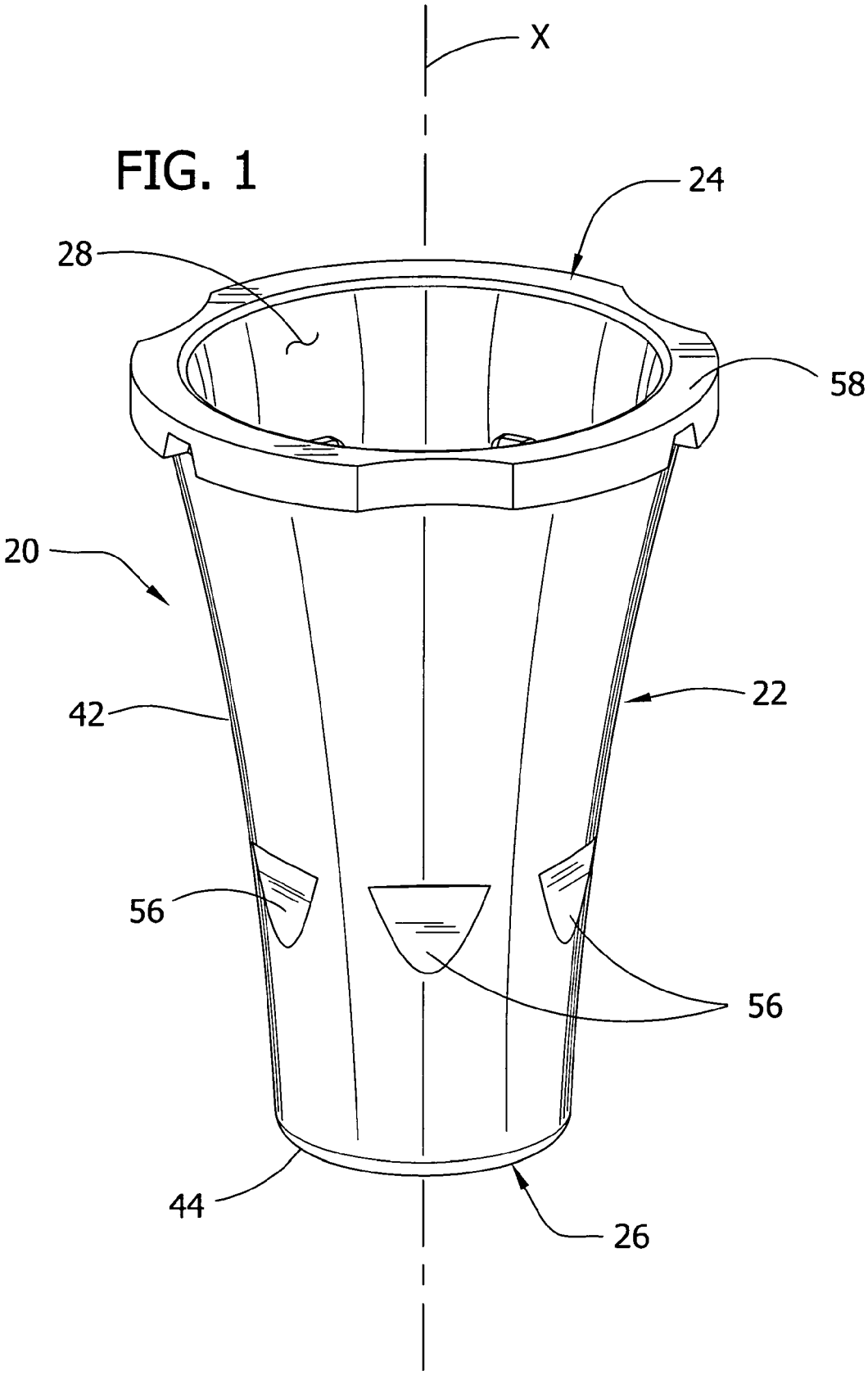
FIGS. 1 and 2 are perspective views of one embodiment of a probe cover of the present invention from different vantage points.
Figure 2:
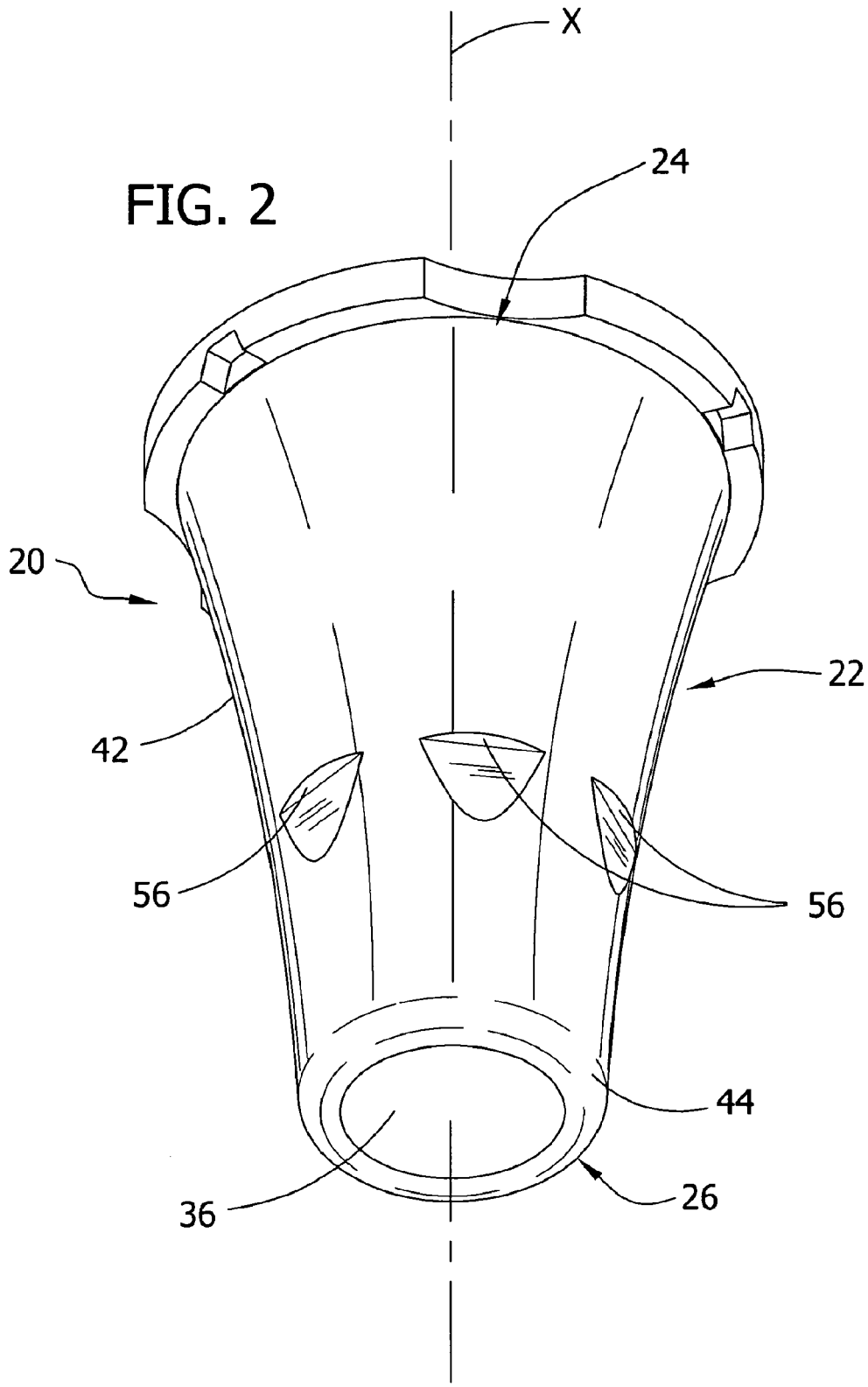

The probe cover 20 includes a flange 58 disposed adjacent the proximal end 24 of the body (see, FIG. 1). The flange 58 extends around the circumference of proximal end 24 of the body 22 providing strength and stability for mounting of the probe cover 20 on the tympanic thermometer 32.

Figure 10A:
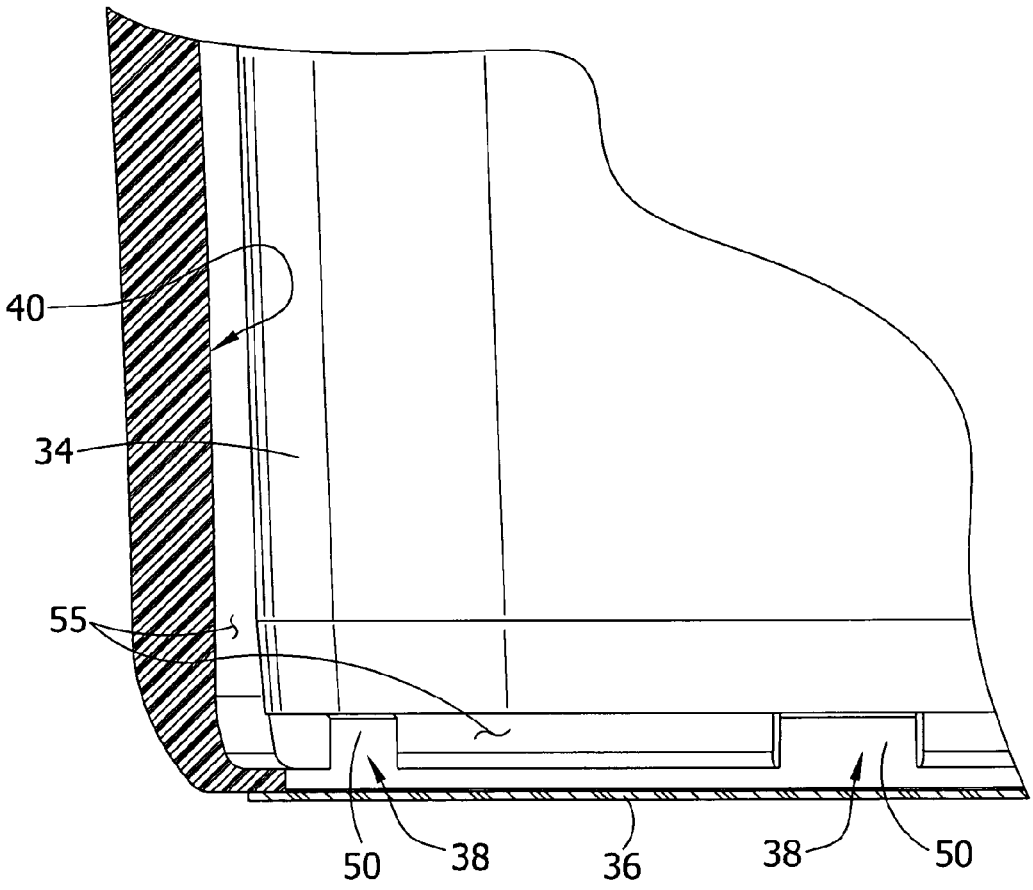
FIG. 10A is an enlarged partial view of a distal end of the cross-sectioned probe cover and thermometer shown in FIG. 10.
Figure 11:
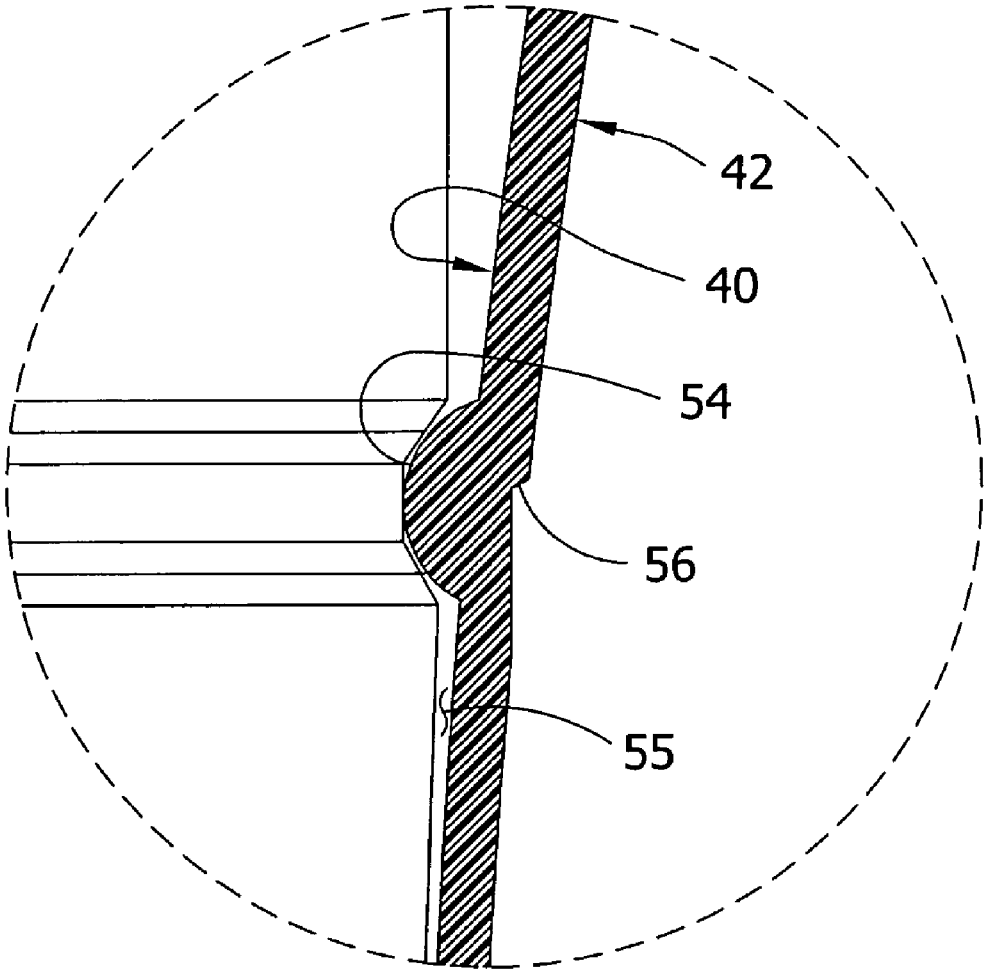
FIG. 11 is an enlarged view of a portion of the cross-sectioned probe cover showing the area of detail indicated in FIG. 10.
Figure 12:
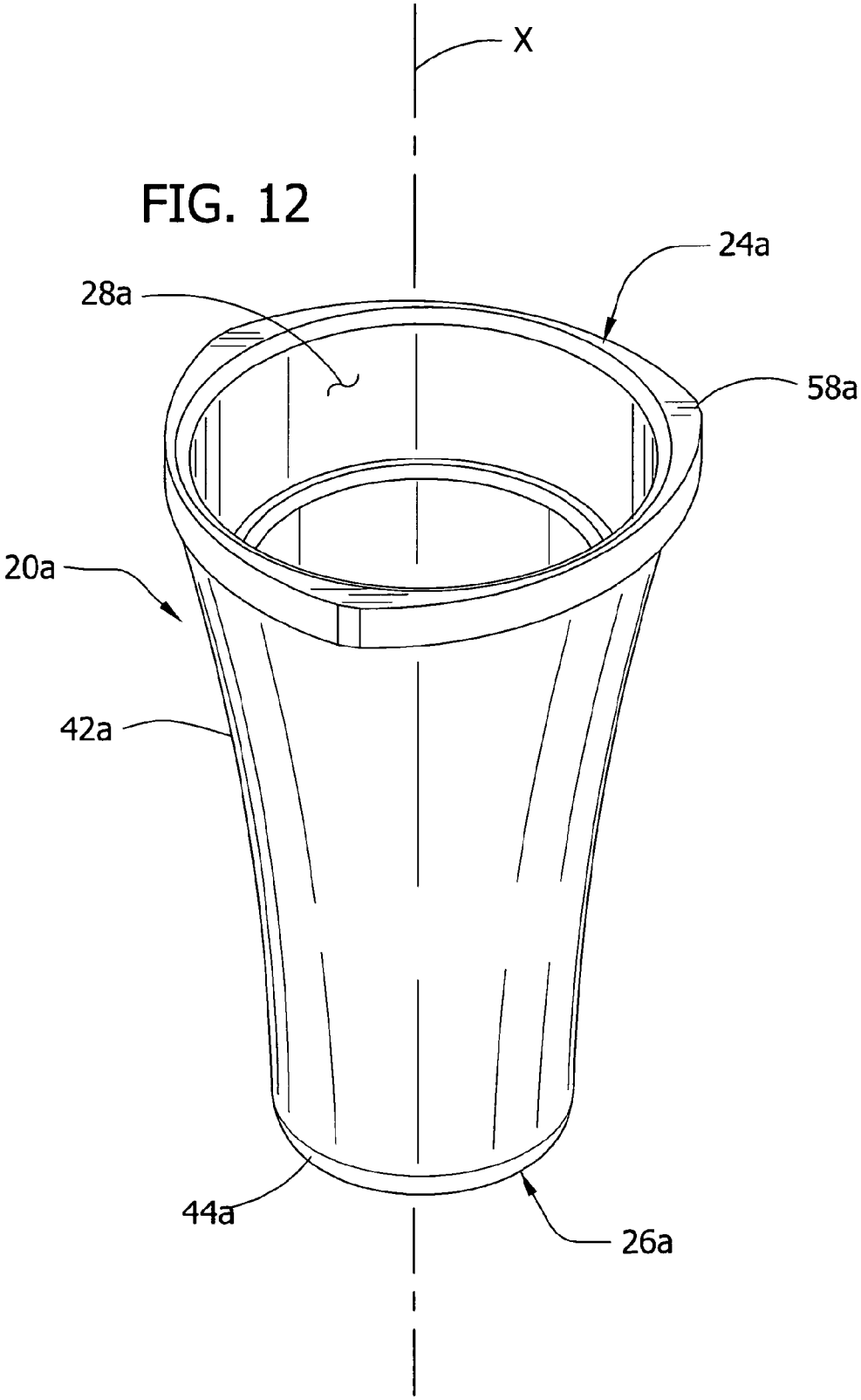
FIGS. 12 and 13 are perspective views of another embodiment of a probe cover of the present invention from two different vantage points.
Figure 13:
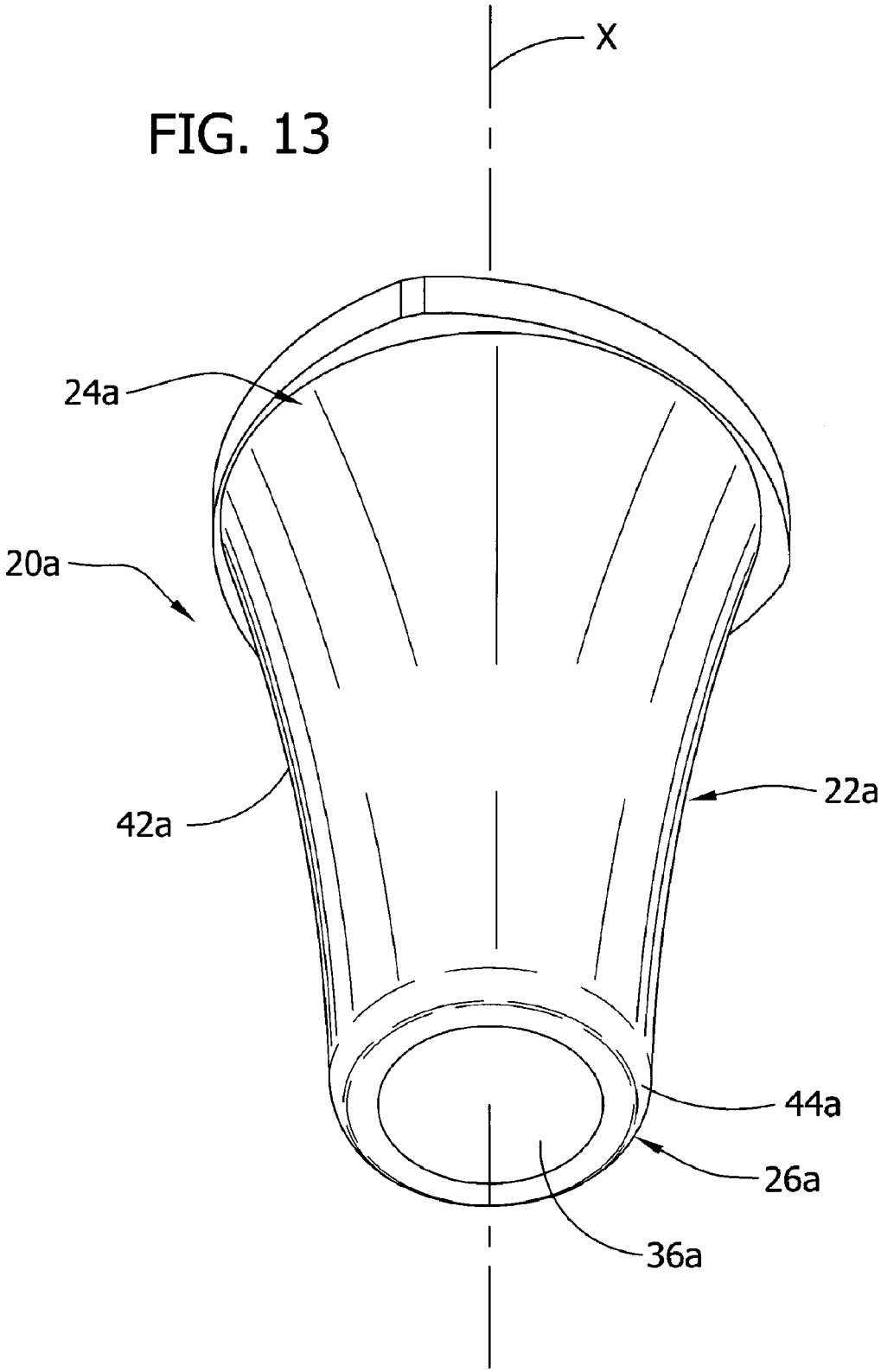

In use, the probe cover 20 is mounted on the heat sensing probe 34 (as shown in FIGS. 10 and 10A) and the film 36 is separated from direct engagement with the heat sensing probe via the air gap 55 maintained by the engagement of the end ribs 38 with the heat sensing probe. Likewise the air gap 55 extends along the side of the heat sensing probe 34 in the spaces between the end ribs 38 and is maintained proximally therefrom by engagement of the inner protuberances 54 and the inner circumferential surface 40 proximal of the longitudinal ribs 52 with the side of the heat sensing probe. The limited contact between the probe cover 20 and heat sensing probe 34 and the air gap 55, which serves as a layer of insulation, reduces undesired conductive heat transfer from the probe cover to the probe 34 and thereby reduces distorted readings and thermal noise interference. Consequently, the probe cover 20 facilitates a more accurate temperature measurement.

To measure a subject's (not shown) body temperature, a practitioner (not shown) pulls the subject's ear back gently to straighten the ear canal so that heat sensing probe 34 can receive infrared emissions directly from the tympanic membrane. The tympanic thermometer 32 is manipulated by the practitioner such that a portion of the probe cover 20, which is mounted on the heat sensing probe 34, is easily and comfortably inserted within the subject's outer ear canal. The heat sensing probe 34 is properly positioned to sense infrared emissions from the tympanic membrane that are indicative of the subject's body temperature. Infrared light emitted from the tympanic membrane passes through the film 36 to the heat sensing probe 34.

The tympanic thermometer 32 is manufactured to be reused, but the probe cover 20 is disposable. Accordingly after one use, the probe cover 20 is discarded and another one of the probe covers may be mounted on the heat sensing probe 34. Thus, the probe covers 20 provide a sanitary barrier for the heat sensing probe 34 to reduce spread of bacteria and disease. Other methods of use of the tympanic thermometer 32 and the probe cover 20 are envisioned, such as, for example, alternative positioning, orientation, etc. without departing from the scope of the invention.

Another embodiment of the probe cover, generally designated 20a, is described with reference to FIGS. 12-16. Yet another embodiment of the probe cover, generally designated 20b, is described with reference to FIGS. 17-19. Still another embodiment of the probe cover, generally designated 20c, is described with reference to FIGS. 20-22. Although the actual designs of probe covers 20a, 20b, and 20c are different in some respects from the embodiment of the probe cover 20 described above, the materials and manufacturing processes used to make probe covers 20a, 20b, and 20c may be substantially the same as those described for probe cover 20 except where noted. Further, probe covers 20a, 20b, and 20c may operate in substantially the same manner as probe cover 20, except as noted. Wherever possible, reference numbers used to describe elements of probe covers 20a, 20b, and 20c are based on the reference numbers used to describe similar elements of probe cover 20 with the letters "a", "b", and "c", respectively, appended thereto.

Referring to FIGS. 12-16 probe cover 20a comprises a tubular body 22a defining a longitudinal axis X and extending in a tapered configuration from a proximal end 24a to a distal end 26a. Proximal end 24a defines an opening 28a configured to receive a distal end 30 of a tympanic thermometer 32, such as, for example, a heat sensing probe 34. The particular tapered configuration shown in the drawings is believed to be comfortable for many subjects when inserted into the ear canal, but the tubular body can have a different tapered configuration, be generally cylindrical, or frustoconical without departing from the scope of the invention. One or more end ribs 38a (e.g., a plurality of end ribs as shown in the drawings) is disposed about an inner circumferential surface 40a of the tubular body 22a at the distal end 26a thereof.

One difference between the probe cover 20a shown in FIGS. 12-16 and the probe cover 20 described previously is that a heat shrinkable film 36a that is substantially transparent to infrared radiation is secured to the tubular body 22 at the distal end 26a thereof. In contrast to the design of probe cover 20, the probe cover 20a is designed to substantially avoid stretching the film 36a upon receipt of the thermometer probe 34 in the opening 28a. Instead, the film 36a is made taught by subjecting the probe cover 20a to a heat treatment that shrinks the film 36a after the film is insert molded to the distal end 26a of the probe 20a during the formation of the probe. Shrinkage of the film 36a during the heat treatment takes up slack in the film and results in a film that is substantially free from wrinkles and other distortions that are of concern from the standpoint of thermometer performance.

Figure 16:
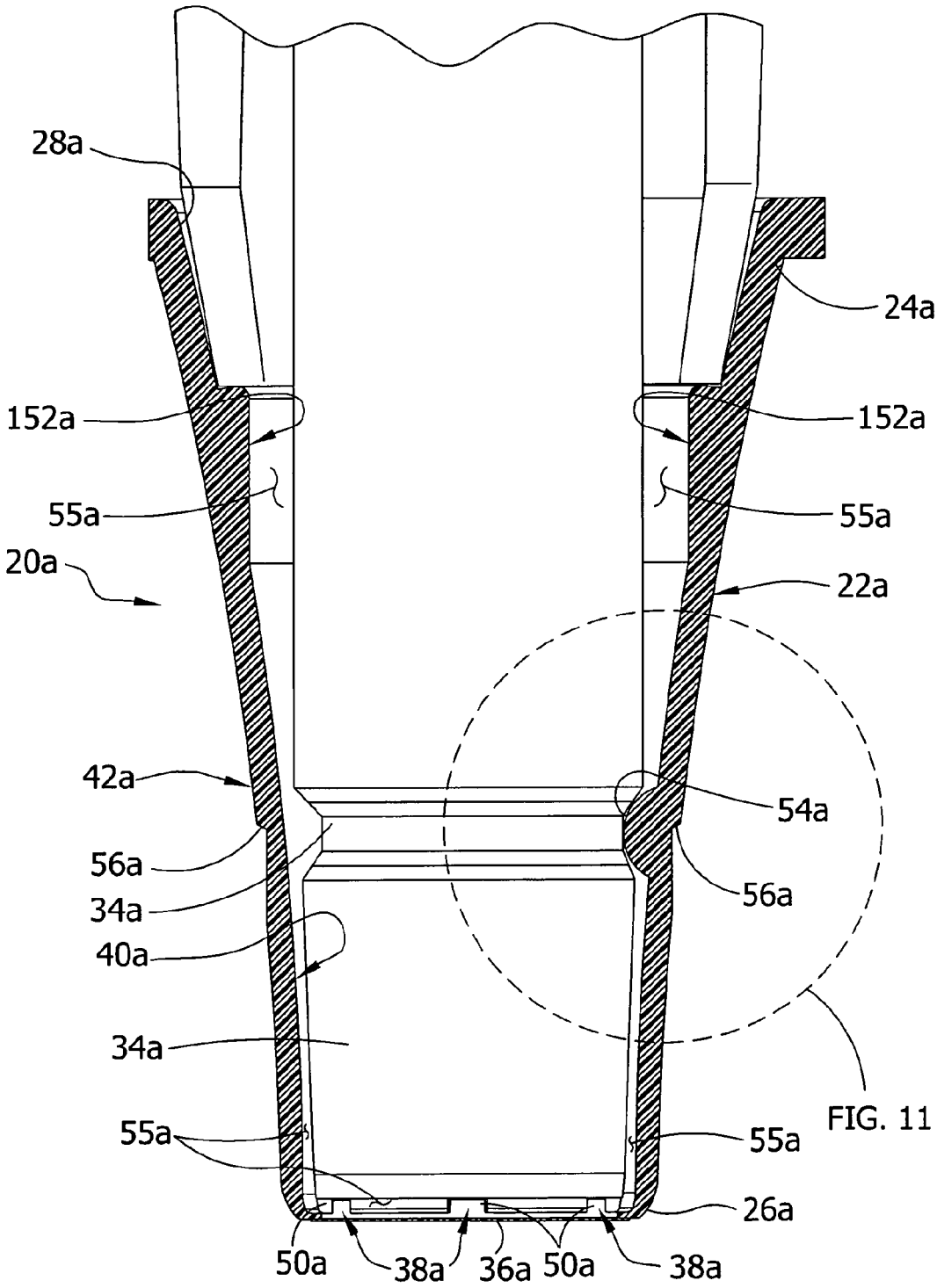
FIG. 16 is a cross-section of the probe cover shown in FIGS. 12-15 mounted on a thermometer probe.

The end ribs 38a are configured to engage the heat sensing probe 34 and keep it spaced apart from the film 36a in substantially the same way that end ribs 38 do for the probe cover 20 described above. Thus, the end ribs 38a maintain an insulating air gap 55a between the distal end of the thermometer probe 34 and the film 36a (FIG. 16). The air gap 55a also extends proximally between the longitudinal portions 46a of the end ribs 38a. However, in contrast to probe cover 20, there is enough clearance between the longitudinal portions 46a of the end ribs 38a and the thermometer probe 34 so that the end ribs 38a are not required to spread apart to accommodate the thermometer probe. Although probe cover 20a is configured so that there is substantially no spreading of the film 36a, it is understood that it is permissible to configure a probe cover to result in some stretching of a heat shrunk film upon receipt of the probe 34 without departing from the scope of the invention as long as the amount of stretching is within acceptable tolerance levels.

A film support 45a is disposed at the distal end 26a of the body 22a. The purpose of the film support 45a is to prevent stress concentrations at the boundary between the film 36a and the contact points of the film with the body 22 at its distal end[.] from accumulating in the film 36a during the heat shrink process. For example, the end ribs 38 of probe cover 20 project into the window (best seen in FIG. 6) and cause the perimeter of the window to have corners *49* turning in the plane of the window. In other words, it is possible to move around the corners *49* defined by the end ribs 38 while always remaining in the plane of the window. If the film 36 of probe cover 20 [were] *is* subjected to a heat shrink treatment, the corners *49* of the end ribs 38 undesirably concentrate stresses in the film, which makes the film vulnerable to tearing. The concentration of stresses at the end ribs 38 also introduce distortions (e.g., wrinkles) into the film 36, interfering with accurate temperature measurement. The film support 45a of probe cover 20a has a distally facing film supporting surface 53a (FIG. 15). In the embodiment shown in the drawings, the film supporting surface 53a is generally perpendicular to the longitudinal axis X. The distal ends of the end ribs 38a can converge and be coplanar with the film supporting surface 53a, as shown in FIGS. 14 and 15, in which case the end ribs can be characterized as part of the film supporting surface. On the other hand, a film support can be distinct from end ribs without departing from the scope of the invention. In some embodiments, the film support 45a is integrally formed as one piece of material with the tubular body 22a and end ribs 38a.

Figure 16A:
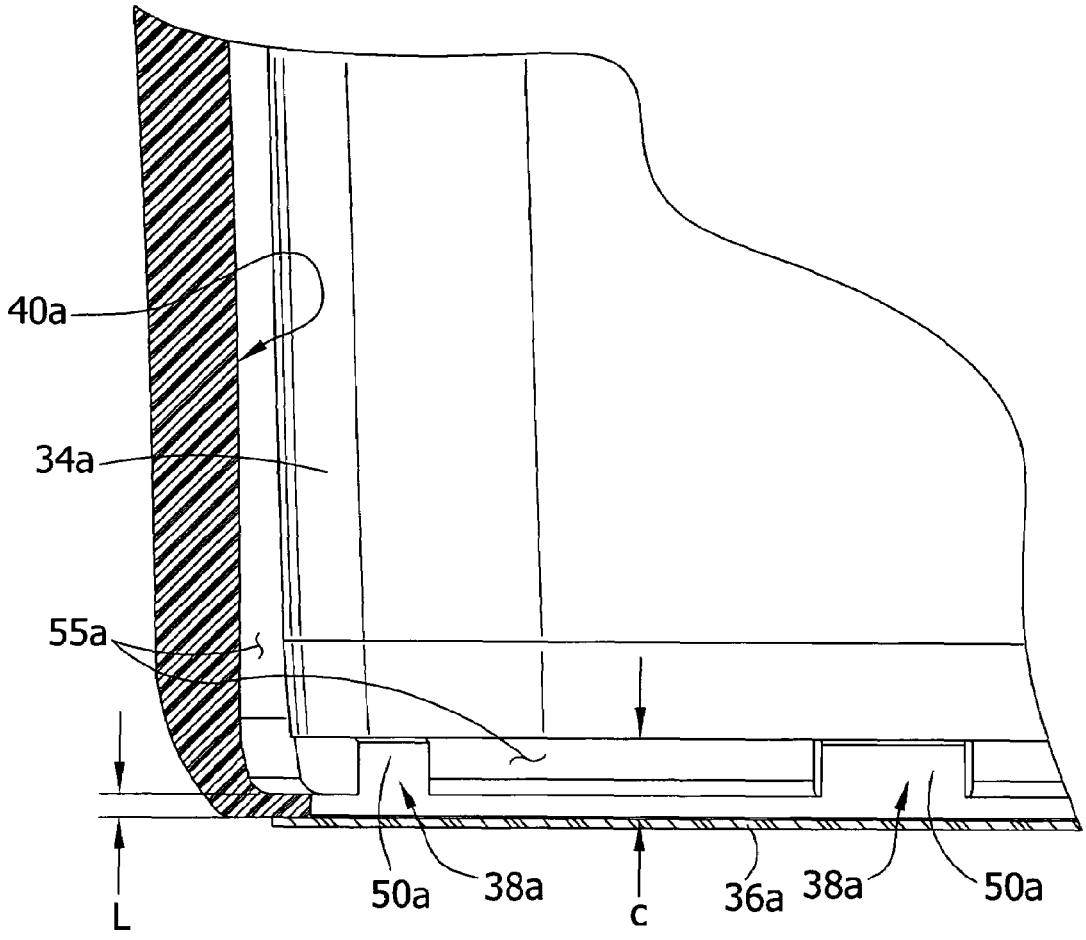
FIG. 16A is an enlarged partial view of a distal end of the cross-sectioned probe cover and thermometer shown in FIG. 16.

The film supporting surface 53a extends circumferentially around the longitudinal axis X at the distal end 26a of the body 22a. The film 36a is secured to the film supporting surface 53a (FIG. 16A). For example, the film 36a may be secured to the film supporting surface 53a at a plurality of points (e.g., in a substantially continuous band of attachment points). Significantly, the film supporting surface 53a, particularly the inner edge 53a' thereof is substantially free from corners and sharp curvatures turning in a plane of the window. *The corners 49a at the ends of the end ribs 38a do not extend into the plane of the window defined by the inner edge 53a' of the film supporting surface 53a.* The absence of corners and sharp curvatures in the inner edge 53a' of the film supporting surface 53a enhances more balanced tensioning of the film 36a during the heat shrink process. This helps prevent wrinkling and tearing of the film 36a. In contrast, the film 36 of the probe cover 20 described above is secured to the generally rectangular distal surfaces of the inward projections 50 of the end ribs 38. The projections 50 have corners *49* that can concentrate stresses in the film 36 and cause wrinkling or tearing of the film, particularly if the film is subjected to heat shrinking.

When manufacturing probe covers in which a separate film is attached to the body of a probe cover, it is desirable to secure the film to the body while the body is still hot (e.g., from an injection molding process) to facilitate bonding of the film to the body. Another advantage of the film support 45 is that helps reduce distortions that can be produced when the film 36a is attached to the body 22a while it is still hot. The end ribs 38a (like the end ribs 38 of the probe cover 20 described above) hold heat longer than other parts of the body 22a because of their greater relative mass. Consequently, the relatively hotter end ribs 38a can produce localized shrinkage of the film 36a upon contact with the film. Although not as hot as the end ribs 38a, portions of the film supporting surface 53a extend between the end ribs and are warmer than the atmosphere. During manufacturing of the probe cover 20a, this reduces temperature gradients experienced by the film 36a compared to temperature gradients that would be encountered by film 36 in the probe cover 20 described previously, thereby reducing the impact of distortions resulting from local shrinkage of the film. The relatively greater surface area of the film supporting surface 53a and the corner-free inner edge 53a' thereof also reduce the impact of any local shrinkage that does occur in the film 36a by making it easier for the film to form a good seal with the body 22a and by moving the perimeter of the window inward and away from the parts of the film that are most affected by local shrinkage.

As best seen in FIG. 15, for example, the film support 45a of probe cover 20a is a ring at the distal end 26a of the body 22a extending along the inner circumferential surface 40a of the body 22a intermediate and coextensive with the distal ends of the end ribs 38a. It will be understood that the ring can have various shapes other than circular without departing from the scope of the present invention. The film support 45a extends the same distance inward toward the longitudinal axis X as the end ribs 38a. Thus, the inner edge 53a' of the film support 45a is smooth and continuous. The inner edge 53a' of the film support 45a is also substantially free from segments having outward curvature. Further, the inner edge 53a' of the film support 45a is substantially free from projections jutting inward (e.g., toward the longitudinal axis X). In the embodiment shown in FIGS. 16 and 16A, the ring of the film support has an axial thickness L that is less than the depth c of the inward projections of the end ribs 38a, thereby allowing the insulating air gap 55a to extend between the inward projections 50a of the end ribs 38. Consequently, the probe cover 20a promotes consistent and accurate temperature measurements. In one embodiment, the dimension L is between about 0.002 inches and about 0.008 inches (e.g., about 0.005 inches). The difference between the dimension L and the dimension c is preferably between about 0.007 inches and about 0.015 inches (e.g., about 0.012 inches).

Another difference between the probe cover 20a shown in FIGS. 12-16 and the probe cover 20 described previously is that probe cover 20a has a continuous annular shoulder 152a instead of the plurality of longitudinal ribs 52 spaced circumferentially around the inner circumferential surface 40 of probe cover 20. The annular shoulder 152a has a proximally facing shelf 157a and tapers distally from the shelf to blend in with the inner circumferential surface 40a of the body 22a. The proximally facing shelf 157a of the annular shoulder 152a can be used as a thrust surface for a probe cover eject mechanism.

Figure 17:
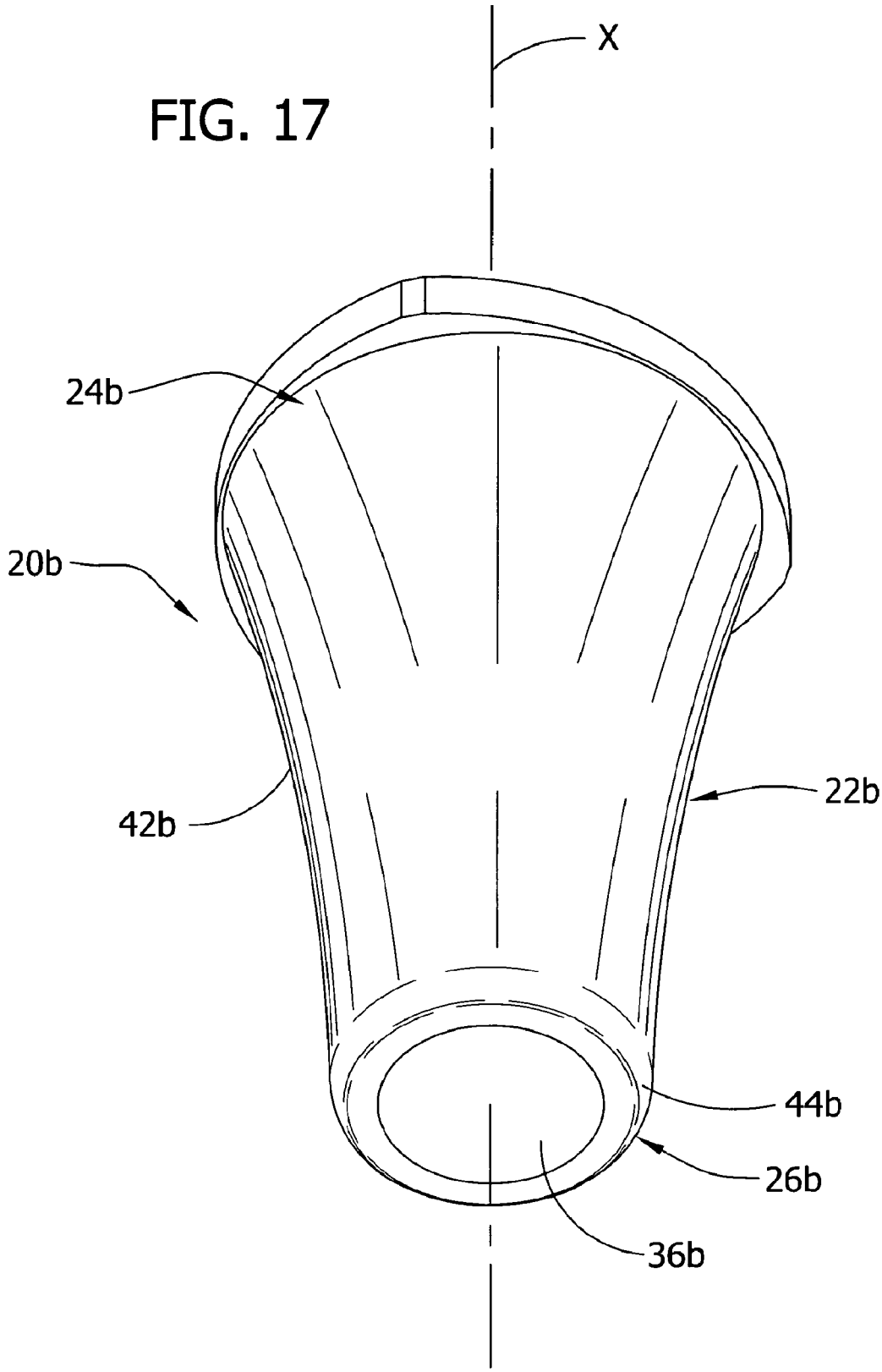
FIG. 17 is a perspective view of another embodiment of a probe cover of the present invention.
Figure 18:
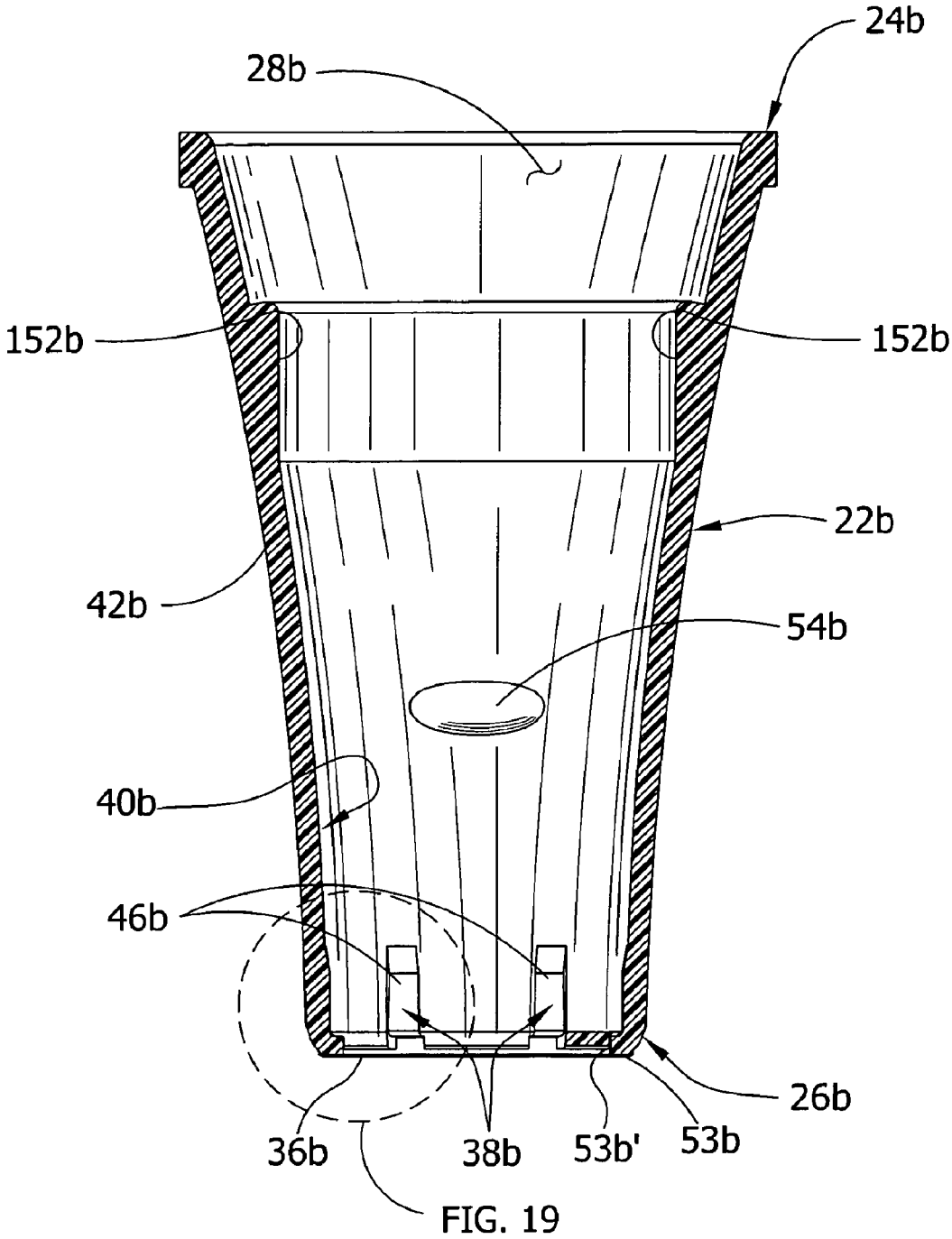
FIG. 18 is a cross-section of the probe cover shown in FIG. 17 in a plane through each of a pair of opposing end ribs.
Figure 19:
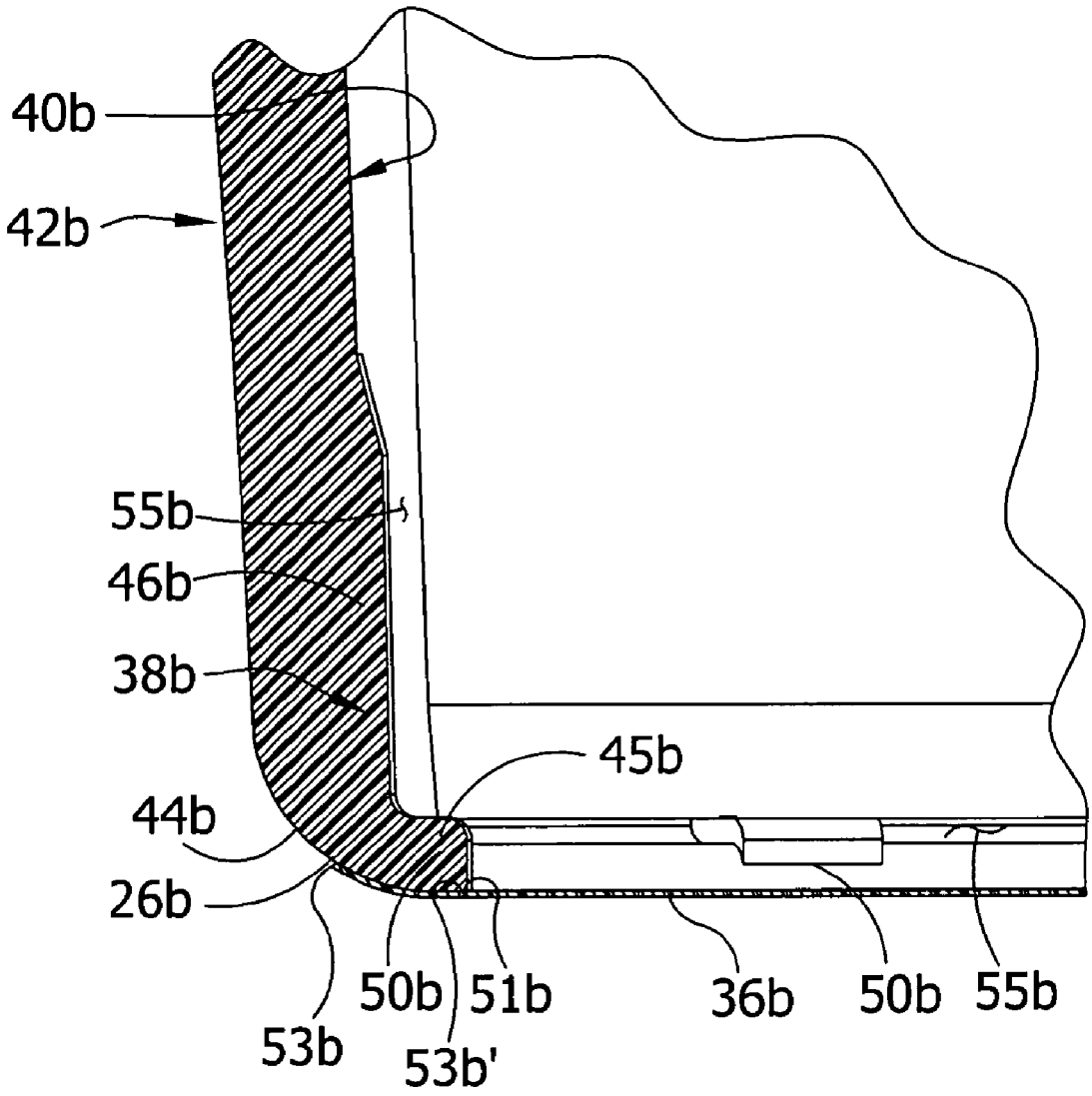
FIG. 19 is an enlarged view of a portion of the cross-sectioned probe cover shown in FIG. 18 with a thermometer probe received therein showing one of the end ribs and a portion of a film support in the area of detail indicated in FIG. 18.

Referring now to FIGS. 17-19 and the embodiment of the probe cover 20b shown therein, it is noted that the probe cover 20b is substantially the same as probe cover 20a, except at its distal end 26b. The probe cover 20b comprises an arcuate surface 44b at the distal end 26a of the tubular body 20b; much like the previously described probe covers 20, 20a. However, the film support 45b blends smoothly into the arcuate surface 44b and there is no edge or other boundary marking the transition from the outer circumferential surface 42b of the tubular body 22b and the film supporting surface 53b of the film support 45b. Further, the film 36b, which is a heat shrinkable film substantially similar to film 36a, is secured to and extends over the arcuate surface 44b at the distal end of the probe cover 20b. Extending the film 36b outward onto the arcuate surface 44b and securing it thereto provides more surface area for a greater attachment strength between the body 22b and the film 36b. It also reduces the potential for rips and tears formed in the perimeter of the film 36b (e.g., when cutting the film in a manufacturing process) to propagate far enough inward to allow contaminants to enter the probe cover 20b through the film or otherwise interfere with proper performance of the probe cover.

The wall thickness along the arcuate surface 44b can gradually decrease as the arcuate surface extends toward the distal end 26b to transition from a thicker wall proximally of the distal end to a thinner wall for the film support 45b, as shown in the drawings. This allows the insulating air gap 55b to extend between the inward projections 50b of the end ribs 38b.

In other respects, the film support 45b is essentially the same as the film support 45a describe above. In particular, the inner edge 53b' of the film support 45b is substantially the same as the inner edge 53a' of the film support 45a of probe cover 20a and reduces stress concentrations when the film 36b is heat shrunk and the problems associated therewith in substantially the same way.

Figure 20:
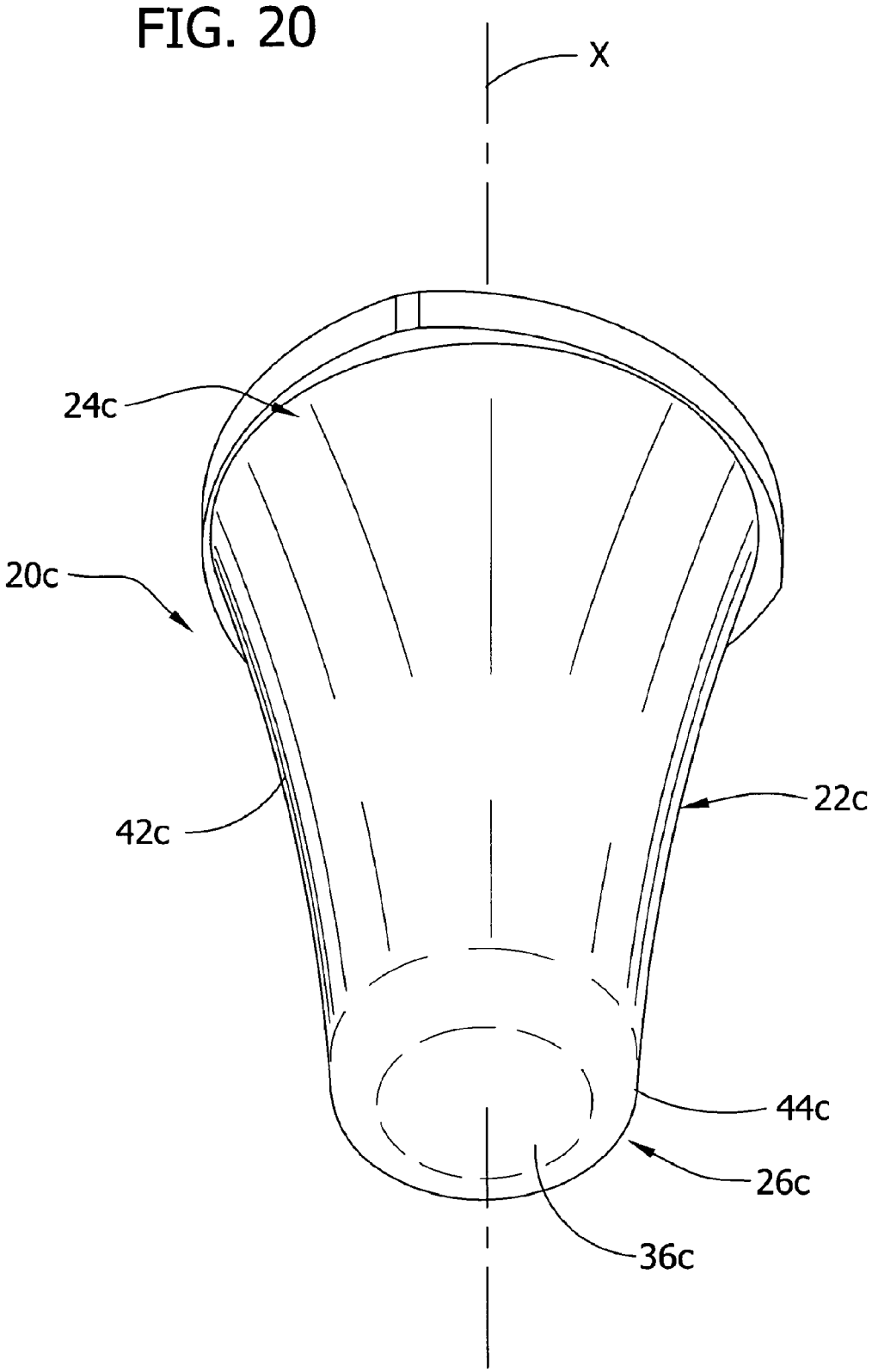
FIG. 20 is a perspective view of still another embodiment of a probe cover of the present invention.
Figure 21:
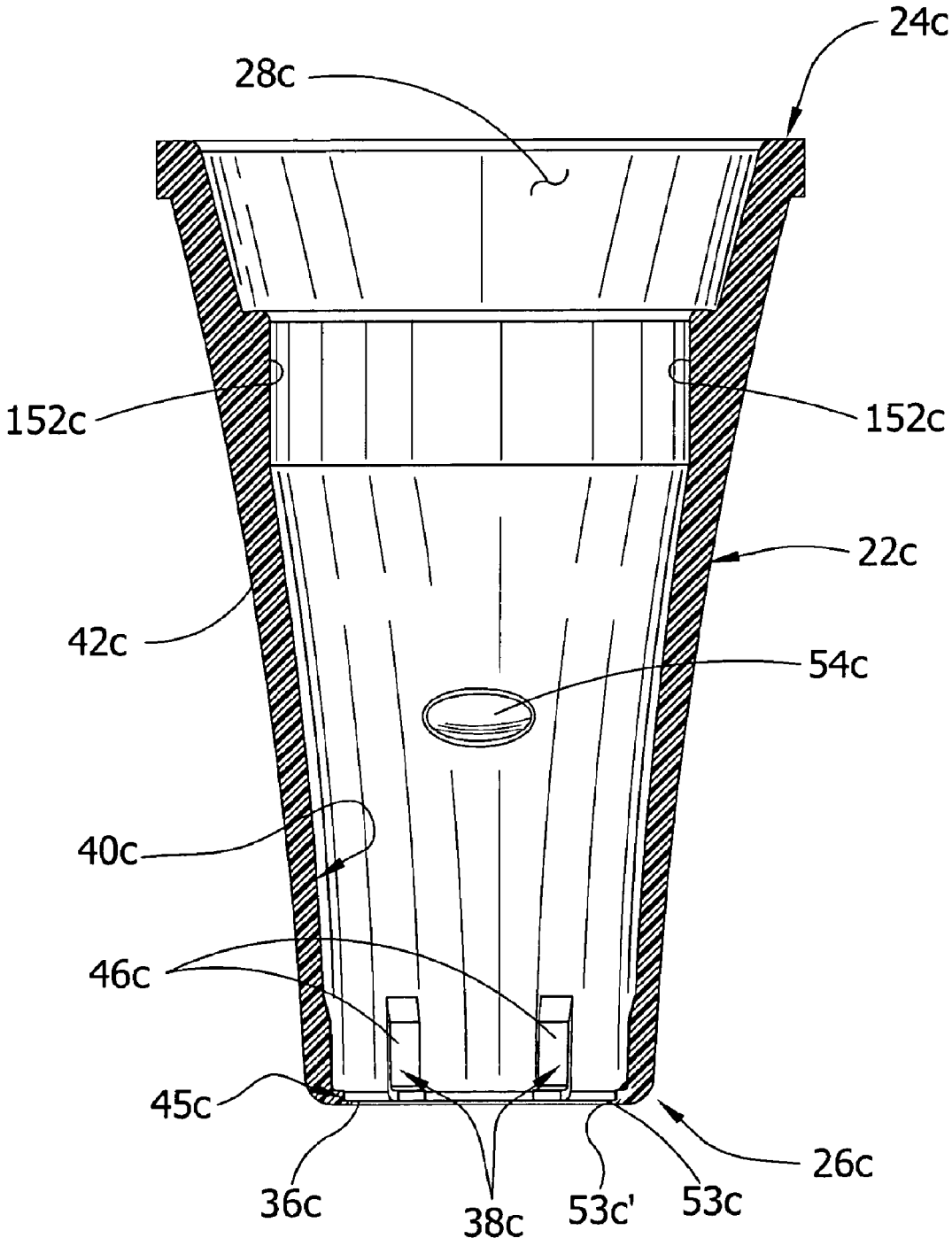
FIG. 21 is a cross-section of the probe cover shown in FIG. 20 in a plane through each of a pair of opposing end ribs.

Referring now to FIGS. 20-22 and the embodiment of the probe cover 20c shown therein, it is noted that the probe cover 20c is substantially the same as the probe cover 20a shown in FIGS. 13-16 except as noted. One difference between probe cover 20c and the probe cover 20a is best seen in comparison of FIGS. 22 and 15. Referring first to FIG. 15, the inner edge 53a' of the film support 45a is flush with the inward faces of the inward projections 50a of the end ribs 38a. In contrast, the inner edge 53c' of the film support 45c shown in FIG. 22 extends farther inward than the end ribs 38c. For instance the film support 45c can be configured to have a distally facing generally planar film supporting surface 53c having a width m between about 0.007 inches and about 0.020 inches (e.g., about 0.017 inches). This provides greater surface area for attaching the film 36c to the film support 45c. For instance, the area of the distally facing film supporting surface 53c of film support 45c may be between about 0.01 square inches and about 0.02 square inches. In one embodiment, the area of the distally facing film supporting surface 53c is at least about 20 percent of the total area of the window defined by the inner edge 53c' of the film support 45c. Generally, the larger the distally facing surface is in all of the embodiments, the more bonding area is provided for the film. This feature also decreases the opportunity for quality defects that may occur during molding the probe covers. Particularly during the release of the mold, there is an opportunity for the film to tear at the edge or to develop pin holes. Although these still may occur in manufacturing, the chances of them causing the probe cover to be of compromised quality are reduced because of the increased surface area for bonding provided by the film support. *Moreover, the corners 49c of the end ribs 38c do not extend into the plane of the window defined by the inner edge 53c' of the film support 53c and do not define any portion of the perimeter of the window.*

In contrast, the film support 45a shown in FIG. 15 does not extend as far toward the longitudinal axis X out of a concern (which is common in the art) that the probe cover 20a might block some of the generally conical field of view of an IR sensor (not shown) in the thermometer probe 34. In contrast, in the embodiment shown in FIGS. 20-22, the inventors have extended the film support 45c far enough inward so that the inner edge 53c' of the film support 45c defining the window perimeter lies closely proximate to the field of vision of the IR sensor (broadly, an electromagnetic radiation sensor).

Referring to FIG. 22, for example, the intersection of the periphery of the field of view of an IR sensor in the probe 34 (not shown in FIG. 22) with the film 36c is indicated by a dashed line 61c. Because the inner edge 53c' of the film support 45c is configured to extend farther inward and encroach on (without entering) the field of view of the IR sensor, there is a relatively smaller annular space (designated 63c on FIG. 22) between the inner edge 53c' of the film support 45c and the field of vision of the IR sensor at the window. For example, the annular space 63c preferably has a width n that is less than about 0.050 inches. The annular space 63c preferably has an area which is less than about 60 percent of an area of the window. In one embodiment, the annular space has an area that is less than about 51 percent of the area of the window, an in one embodiment the area of the annular space is about 9 percent of the area of the window.

The probe cover 20c operates in substantially the same way as the other probe covers 20, 20a, and 20b described in detail herein. However, any rips, tears, or other damage in the film 36c caused during cutting of the film during manufacturing are less likely to propagate into the window or otherwise interfere with temperature measurement because of the greater distance they would have to propagate to reach the window from the edge of the film.

Those skilled in the art will recognize that the embodiments described above are examples of the invention and that there is room for substantial variation in the design of the probe cover within the scope of the invention. In particular, the size, shape, and/or configuration of the probe cover can be modified to achieve the advantages of the invention for virtually any available tympanic thermometer. Also, the size, shape, and/or configuration of the body, arcuate surface, window, end ribs, film support, and/or other elements of the probe cover can be modified from the sizes, shapes and configurations described herein and shown in the drawings to accommodate various preferences for style, comfort, and/or other design criteria without departing from the scope of the invention.

Accordingly, it will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A probe cover for a probe of a tympanic thermometer, said probe cover comprising:

a generally tubular body having a longitudinal axis, an opening at a proximal end of the body for receiving a thermometer probe, and a film window at a distal end of the body generally opposite said proximal end;

a film support extending radially inward from said distal end of the body toward said longitudinal axis and having an inner edge extending circumferentially around said longitudinal axis and defining a perimeter of said window; and the film window is secured at a film support surface at a distal end of the film support and extends beyond the inner edge of the film support, the film extends over the film support surface and substantially toward an outer edge of the body, a plurality of end ribs spaced apart and disposed about an inner circumference of the distal end of the body, each of the end ribs being positioned to engage a distal end of the thermometer probe and prevent contact of the film by the thermometer probe, wherein the inner edge of the film support extends substantially the same distance inward as a transverse portion of each of the plurality of end ribs and further wherein at least some of the end ribs converge with the film support, the probe cover being substantially transparent to infrared radiation through the window, and the perimeter of the window being substantially free from corners in a plane of the window.

2. A probe cover as recited in claim 1, wherein the inner edge of the film support is substantially free from segments having an outward curvature.

3. A probe cover as recited in claim 1, wherein the perimeter of the window is substantially free from segments projecting into the window.

4. A probe cover as recited in claim 3, wherein the perimeter of the window is generally smooth and continuous.

5. A probe cover as recited in claim 4, wherein the perimeter of the window is substantially circular.

6. A probe cover as recited in claim 1, wherein the film support is formed as one piece of material with the body.

7. A probe cover as recited in claim 6, wherein the end ribs are formed as one piece of material with the body.

8. A probe cover as recited in claim 1, wherein each of the end ribs comprises a projection extending radially inward toward said longitudinal axis along a surface of the film support.

9. A probe cover as recited in claim 8, wherein the projections of the end ribs extend toward the longitudinal axis no farther than the inner edge of the film support.

10. A probe cover as recited in claim 8, wherein the inner edge of the film support extends farther toward the longitudinal axis than the projections.

11. A probe cover as recited in claim 1, wherein the body has an arcuate surface adjacent the distal end, the film being secured to the arcuate surface.

12. A probe cover as recited in claim 1 wherein the film support defines a substantially flat distally facing surface at the distal end of the body having a generally annular area that is at least about 20 percent of a total area of the window.

13. A probe cover for a probe of a tympanic thermometer, said probe cover comprising:

a generally tubular body having a longitudinal axis, an opening at a proximal end of the body for receiving a thermometer probe, and a window at a distal end of the body generally opposite said proximal end, the body defining a circumferential inner surface extending generally from the proximal end to the distal end;

a film support extending radially inward from said distal end of the body toward said longitudinal axis and having an inner edge extending circumferentially around said longitudinal axis and defining a perimeter of said window;

a plurality of end ribs at the distal end of the body, the end ribs further comprising a transverse portion;

the inner edge and the transverse portion of the end ribs substantially extend the same distance inward toward the centerline of the longitudinal axis of the tubular body; and the film is secured at a film support surface at a distal end of the film support and beyond the inner edge of the film support, the film extends over the film support surface and substantially toward an outer edge of the body, the probe cover being configured to maintain a gap between the film and a distal end of the thermometer probe received in the opening, said gap having extensions into areas between said circumferential inner surface of the body and a side of the thermometer probe, the probe cover being substantially transparent to infrared radiation through the window, the perimeter of the window being substantially free from corners in a plane of the window.

14. A probe cover as recited in claim 13 in combination with a thermometer probe received in the opening.

15. A probe cover as recited in claim 14, wherein said inner edge of the film support is substantially free from segments having an outward curvature.

16. A probe cover as recited in claim 15, wherein the perimeter of the window is substantially free from segments projecting into the window.

17. A probe cover as recited in claim 16, wherein the perimeter of the window is generally smooth and continuous.

18. A probe cover as recited in claim 17, wherein the perimeter of the window is substantially circular.

19. A probe cover as recited in claim 13, wherein the film support is formed as one piece of material with the body.

20. A probe cover as recited in claim 19 wherein the end ribs are formed as one piece of material with the body.

21. A probe cover as recited in claim 13, further comprising a plurality of end ribs, each end rib projecting radially inward toward said longitudinal axis along a surface of the film support.

22. A probe cover as recited in claim 21, wherein the end ribs extend toward the longitudinal axis no farther than the inner edge of the film support.

23. A probe cover as recited in claim 22, wherein the end ribs each have an inner edge that is flush with the inner edge of the film support.

24. A probe cover as recited in claim 13, wherein the body comprises an arcuate surface adjacent the distal end, the film being secured to the arcuate surface.

25. A probe cover as recited in claim 13 wherein the film support defines a substantially flat distally facing surface at the distal end of the body having a generally annular area that is at least about 20 percent of a total area of the window.

* * * * *